US012480776B2

(12) United States Patent
Jung et al.

(10) Patent No.: US 12,480,776 B2
(45) Date of Patent: Nov. 25, 2025

(54) ROUTE GUIDANCE METHOD AND DEVICE USING AUGMENTED REALITY VIEW

(71) Applicant: NAVER CORPORATION, Seongnam-si (KR)

(72) Inventors: Jeanie Jung, Seongnam-si (KR); Yeowon Yoon, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 265 days.

(21) Appl. No.: 18/185,831

(22) Filed: Mar. 17, 2023

(65) Prior Publication Data

US 2023/0228587 A1 Jul. 20, 2023

Related U.S. Application Data

(63) Continuation of application No. PCT/KR2021/005279, filed on Apr. 27, 2021.

(30) Foreign Application Priority Data

Sep. 18, 2020 (KR) ........................ 10-2020-0120680

(51) Int. Cl.
*G01C 21/36* (2006.01)
*G01C 21/34* (2006.01)
*G06T 19/00* (2011.01)

(52) U.S. Cl.
CPC ..... *G01C 21/3638* (2013.01); *G01C 21/3415* (2013.01); *G01C 21/3476* (2013.01);
(Continued)

(58) Field of Classification Search
CPC .............. G01C 21/206; G01C 21/3415; G01C 21/3446; G01C 21/3476; G01C 21/3492;
(Continued)

(56) References Cited

U.S. PATENT DOCUMENTS

| 10,970,545 B1* | 4/2021 | Charles ................... G06V 20/20 |
| 2011/0153198 A1* | 6/2011 | Kokkas .............. G01C 21/3647 701/533 |
| 2019/0063935 A1* | 2/2019 | Badalamenti .......... G06Q 50/40 |

FOREIGN PATENT DOCUMENTS

| CN | 111595346 B | 4/2022 | |
| EP | 3522081 A1 * | 8/2019 | ......... G06Q 30/0201 |

(Continued)

OTHER PUBLICATIONS

Naver Labs, Indoor AR Navi (Hyundai Department Store, Pangyo), https://www.youtube.com/watch?v=wKH1vMysHJY (Year: 2019).*
(Continued)

*Primary Examiner* — Kito R Robinson
*Assistant Examiner* — Rose Ridder
(74) *Attorney, Agent, or Firm* — Harness, Dickey & Pierce, P.L.C.

(57) ABSTRACT

A method of obtaining a route from a point of departure to a destination includes providing route guidance through an augmented reality (AR) view including an image captured by a camera. To provide route guidance, as a user terminal moves toward a destination on the basis of an obtained route, when an interaction occurs between the user terminal and a node or a link in which predetermined information included in the route is registered, content associated with the predetermined information is augmented and displayed as guidance information on an image of an AR view.

18 Claims, 20 Drawing Sheets

(52) U.S. Cl.
CPC ..... *G01C 21/3492* (2013.01); *G01C 21/3602* (2013.01); *G01C 21/3617* (2013.01); *G01C 21/362* (2013.01); *G01C 21/3632* (2013.01); *G01C 21/3644* (2013.01); *G01C 21/3647* (2013.01); *G01C 21/3697* (2013.01); *G06T 19/006* (2013.01)

(58) Field of Classification Search
CPC ............ G01C 21/3602; G01C 21/3617; G01C 21/362; G01C 21/3632; G01C 21/3638; G01C 21/3644; G01C 21/3647; G01C 21/3682; G01C 21/3697; G01C 21/3811; G06T 17/00; G06T 19/006
USPC ......................................................... 701/436
See application file for complete search history.

(56) References Cited

FOREIGN PATENT DOCUMENTS

| | | | | | |
|---|---|---|---|---|---|
| JP | 2014020863 | A | | 2/2014 | |
| JP | 2015017922 | A | * | 1/2015 | |
| JP | 2020046254 | A | | 3/2020 | |
| JP | 2020123082 | A | * | 8/2020 | |
| KR | 1020130123340 | A | | 11/2013 | |
| KR | 1020140065963 | A | | 5/2014 | |
| KR | 1020150088662 | A | | 8/2015 | |
| KR | 1020170088686 | A | | 8/2017 | |
| KR | 2009031 | B1 | * | 8/2019 | ......... G01C 21/3602 |
| KR | 102009031 | B1 | | 8/2019 | |
| KR | 2019143626 | A | * | 12/2019 | ......... G01C 21/3407 |
| KR | 20190143626 | A | * | 12/2019 | ............. G08G 1/142 |
| KR | 1020190143626 | A | | 12/2019 | |

OTHER PUBLICATIONS

Office Action issued in corresponding Japanese patent application No. 2023-517677, dated Feb. 27, 2024.
Indoor AR Navi, COEX Demo, 00:00~01:27, (Jan. 8, 2019); https://www.youtube.com/watch?v=YkQXzqSkaDU.
The highest level of challenge, Gangnam Station indoor AR navigation, (Aug. 2, 2020) https://www.naverlabs.com/storyDetail/173.
ISR issued in PCT/KR2021/005279, dated Dec. 21, 2021.

* cited by examiner

<User terminal>

ROUTE GUIDANCE METHOD AND DEVICE USING AUGMENTED REALITY VIEW

CROSS-REFERENCE TO RELATED APPLICATIONS

This is a continuation application of International Application No. PCT/KR2021/005279, filed Apr. 27, 2021, which claims the benefit of Korean Patent Application No. 10-2020-0120680, filed Sep. 18, 2020.

BACKGROUND OF THE INVENTION

Field of Invention

One or more example embodiments of the following description of the present invention relate to a route guidance method and a device using an augmented reality (AR) view, and more particularly, to technology for providing route guidance based on information that is pre-registered to a node/link included in a route.

Description of Related Art

Augmented reality (AR) refers to technology that fuses and complements virtual objects and information created with computer technology in the real world. That is, AR may be technology for augmenting and displaying virtual content in a real environment and a user may view augmented content corresponding to the real environment through an electronic device.

Various services using such AR technology are being developed. For example, Korean Patent Laid-Open Publication No. 10-2014-0065963 (published on May 30, 2014) describes an AR navigator that is installed in a vehicle to display a video of a driving route captured by a camera on a display, and to map and display virtual display information for guiding the driving route to the video displayed on the display.

BRIEF SUMMARY OF THE INVENTION

One or more example embodiments of the present invention provide a route guidance method that may augment and display content related to corresponding predetermined information in a video of an augmented reality (AR) view as guidance information, in response to an occurrence of an interaction between a user terminal and a node or a link include in the route to which the predetermined information is registered, when providing route guidance through the AR view that includes the video captured by a camera of the user terminal.

One or more example embodiments provide a route guidance method that may augment and display additional guidance information in a video of an AR view based on a route attribute that represents a characteristic of an acquired (or generated) route from a starting point to a destination.

One or more example embodiments provide a route guidance method that may augment and display additional guidance information in a video of an AR view or may modify and display guidance information displayed in association with a node or a link, based on real-time information on periphery of a user terminal acquired based on the video.

According to an aspect of the present invention, there is provided a route guidance method performed by a user terminal, the route guidance method including acquiring a route from a starting point to a destination set by a user of the user terminal; providing route guidance from the starting point to the destination through an augmented reality (AR) view that includes a video captured by a camera of the user terminal based on the route. The route includes a plurality of nodes, and the providing of the route guidance includes augmenting and displaying content related to predetermined information in the video as guidance information when an interaction occurs between the user terminal and a node to which the predetermined information is registered among the plurality of nodes or a link to which the predetermined information is registered among links that connects two nodes among the plurality of nodes, as the user terminal moves toward the destination based on the route.

When the user terminal approaches within a predetermined distance from a location corresponding to the node to which the predetermined information is registered or the link to which the predetermined information is registered, or arrives at the corresponding location, the interaction may be determined to have occurred.

The augmenting and displaying may include modifying the content and augmenting and displaying the modified content in the video to display different guidance information according to a direction in which the user terminal approaches the node to which the predetermined information is registered or the link to which the predetermined information is registered.

The content may be displayed at a location related to the node to which the predetermined information is registered or the link to which the predetermined information is registered in the video, and may include at least one of information on a direction in which the user is to move and an action to be taken by the user.

A location at which the content is displayed in the video may be determined based on a location of a vanishing point of the video.

The content may include information on the action to be taken by the user, and the information on the action may include at least one of passing through a ticket gate, passing through an entry gate, passing through an exit gate, moving to stairs, avoiding obstacles, using an elevator, and preparing a ticket or fare.

The route guidance method may further include displaying a map view that includes a map matched to the video with the AR view. The map view may include the route and a current location of the user terminal.

The providing of the route guidance may include augmenting and displaying, in the video, a direction indicator indicating a direction in which the user is to move to reach the destination.

The augmenting and displaying of the direction indicator in the video may include displaying the direction indicator in an area corresponding to the surface of the route and when the user is required to make a turn, displaying an additional direction indicator indicating the turn above the surface.

The providing of the route guidance may include augmenting and displaying, in the video, information indicating a need for peripheral scanning after moving to a floor when the user terminal is determined to be present on a floor different from that of the destination.

The providing of the route guidance may include augmenting and displaying, in the video, additional guidance information based on a route attribute of the route as the user terminal moves toward the destination based on the route.

The augmenting and displaying of the additional guidance information in the video may include augmenting and displaying, in the video, at least one of first additional guidance information for guiding the user to continue going straight when the user is required to go straight for a predetermined first distance or more from a current location, second additional guidance information for requesting to maintain the AR view when the user is required to make a turn first number of times or more within a predetermined second distance from the current location, and third additional guidance information including text information for guiding turns of a second number of times or more when the user is required to make a turn the second number of times or more within a predetermined third distance from the current location.

The route may include a movement between floors, and the augmenting and displaying of the additional guidance information may include augmenting and displaying, in the video, information indicating that the movement between floors is required as the additional guidance information without displaying a direction indicator indicating a direction in which the user is to move to reach the destination, when the user terminal is determined to be present on a floor different from that of the destination.

The augmenting and displaying of the additional guidance information in the video may include augmenting and displaying information on a point of interest (POI) present around the route in the video as the additional guidance information as the user terminal moves toward the destination based on the route, and the POI may be a POI previously visited by the user or a POI preregistered by the user.

The route guidance method may further include augmenting and displaying information on a POI present around a current location of the user in the video as the user terminal moves towards the destination based on the route. Information on the POI may be tagged information by including z-axis location information for an object corresponding to the POI included in a map that represents a three-dimensional (3D) space corresponding to periphery of the current location, and a location for displaying information on the POI in the video may be determined based on the z-axis location information.

Information on the POI may be augmented and displayed in the video to reflect a 3D location of the POI in the video.

The providing of the guidance information may include acquiring real-time information on periphery of the user terminal based on the video; and augmenting and displaying additional guidance information on the route guidance to the destination in the video or modifying the content to display different guidance information and augmenting and displaying the modified content in the video, based on the real time information.

The augmenting and displaying of the additional guidance information in the video or the modifying of the content to display different guidance information, and the augmenting and displaying of the modified content in the video may include, when a congestion level around the user terminal determined based on the real-time information is greater than or equal to a predetermined value, augmenting and displaying, in the video, text information that includes guidance on at least a portion of the route around the user terminal and information that requests to not maintain the AR view as the additional guidance information.

The augmenting and displaying of the additional guidance information in the video or the modifying of the content to display different guidance information and augmenting and displaying the modified content in the video may include, when the congestion level around the user terminal determined based on the real-time information is greater than or equal to the predetermined value, augmenting and displaying the additional guidance information in the video to provide guidance on a detour route for at least a portion of the route around the user terminal, or modifying the content and augmenting and displaying the modified content in the video.

The providing of the route guidance may include researching for the route to the destination when a location of the user terminal deviates from the route by a predetermined distance or more, and when a congestion level around the user terminal determined based on the real-time information is greater than or equal to a predetermined value, the predetermined distance may be set to further increase.

According to another aspect, there is provided a computer system for implementing a user terminal, the computer system including at least one processor configured to execute computer-readable instructions included in a memory. The at least one processor may be configured to acquire a route from a starting point to a destination set by a user, the route including a plurality of nodes, to provide route guidance from the starting point to the destination through an augmented reality (AR) view that includes a video captured by a camera of the user terminal based on the route, and to augment and display content related to predetermined information in the video as guidance information when an interaction between the user terminal and a node to which the predetermined information is registered among the plurality of nodes or a link to which the predetermined information is registered among links that connects two nodes among the plurality of nodes, as the user terminal moves toward the destination based on the route.

According to some example embodiments, when providing route guidance through an augmented reality (AR) view, it is possible to provide guidance information that considers a characteristic of a node or a link including information on at least a direction in which a user needs to move by augmenting and displaying, in a video, content related to predetermined information registered to a node or a link included in an acquired (or generated) route. Therefore, dynamic content may be provided for the route guidance in association with the node or the link included in the route.

According to some example embodiments, it is possible to provide guidance information that considers a characteristic of a route itself in addition to a characteristic of each node or link included in a route by augmenting and displaying additional guidance information in a video of an AR view based on a route attribute of the acquired (or generated) route.

According to some example embodiments, it is possible to provide guidance information suitable for a situation of route guidance time by augmenting and displaying guidance information in a video of an AR view based on real-time information on periphery of a user terminal.

DETAILED DESCRIPTION OF THE INVENTION

Hereinafter, some example embodiments of the present invention will be described with reference to the accompanying drawings.

The example embodiments relate to a method of providing route guidance from a starting point to a destination using an augmented reality (AR) view as a location-based AR service.

The route guidance in the example embodiment may be performed in an indoor space and/or an outdoor area. That is, at least one of the starting point and the destination may be an indoor location or an outdoor location and the route guidance may be performed not only indoors or outdoors but also in a complex area in which indoor and outdoor spaces are combined.

The term "destination" refers to a location or a place at which a user desires to arrive and may be set through a user terminal. The term "starting point" may be a current location of the user. Alternatively, the starting point may be a location set by the user terminal.

In the following description, a location of the user terminal may be explained as a location of a user (holding the user terminal) for clarity of description. Also, for clarity of description, the terms "user" and "user terminal" of the user may be interchangeably used.

In the following description, "augmenting and displaying" content and/or information in a video may be interpreted as the inclusive meaning of overlappingly displaying the content and/or the information in the video depending on example embodiments.

In an AR navigation that provides route guidance through AR, in the case of augmenting only a turn by turn (TBT) and a direction/arrow indicator for a route along which the user needs to move with respect to an actual camera view (AR view), the user in a real situation may be simply guided with a direction sign and thus, may feel information is lacking when moving along the route. In the following example embodiment, additional guidance information based on information added to a node and/or link included in the route may be augmented and displayed for a camera view. Therefore, when the user moves along the route, the user may receive additional information required beyond a simple direction guidance.

The example embodiment may provide an AR navigation that may guide an action of the user or provide additional information suitable for a situation of the user and/or the route (or periphery) of the user beyond simply guiding or displaying a direction of the route along which the user needs to move.

Figure 1:
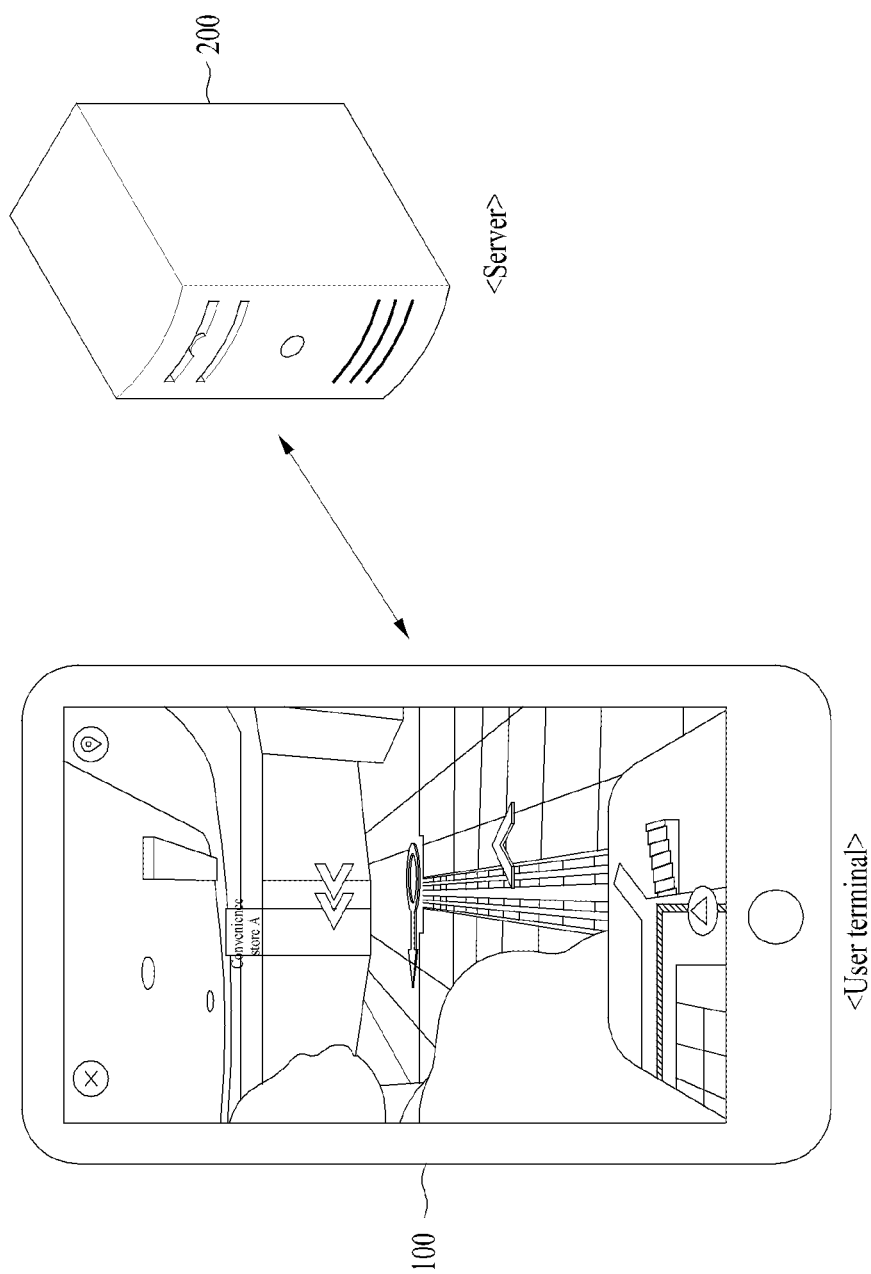
FIG. 1 illustrates a route guidance method using an augmented reality (AR) view according to an example embodiment.

FIG. 1 illustrates a route guidance method using an AR view according to an example embodiment.

Referring to FIG. 1, the user terminal 100, such as a smartphone, may capture the surroundings using a camera and may provide a route through an AR view that includes virtual content augmented in a live video captured by the camera.

In the video of the AR view, a virtual direction indicator indicating a direction in which the user needs to move to arrive at the destination may be displayed. The user may identify a direction and a turn to move to arrive at the destination by referring to the direction indicator.

The user terminal 100 may communicate with a server 200 to provide route guidance using the AR view. In response to a request from the user of the user terminal 100, the server 200 may generate a route to the destination and may transmit guidance information for providing the generated route to the user terminal 100. That is, the user terminal 100 may acquire the route generated by the server 200.

The server 200 may be a server configured to store and maintain data for generating the route and guidance information on the route. For example, the server 200 may be a map server that provides a digital map (three-dimensional (3D) map and/or two-dimensional (2D) map).

In providing route guidance, the user terminal 100 may further display a map view that include a map matched to the video of the AR view, with the AR view. Therefore, the user may find the destination by referring to the video displayed through the AR view but also the map corresponding thereto.

In an example embodiment, when the user terminal 100 provides route guidance through the AR view, the user terminal 100 may augment and display content related to corresponding predetermined information in a video of the AR view as guidance information in response to an occurrence of an interaction between the user terminal 100 and a node or a link included in the route acquired (or generated by the server 200) to which the predetermined information is registered.

That is, the content may be augmented and displayed in the video of the AR view as guidance information related to a node or a link included in the route as well as the direction indicator, and the user may identify the content and receive more detailed guidance related to the route.

A more detailed method of augmenting and displaying content in a video as guidance information is further described with reference to FIGS. 2 to 20.

Figure 2:
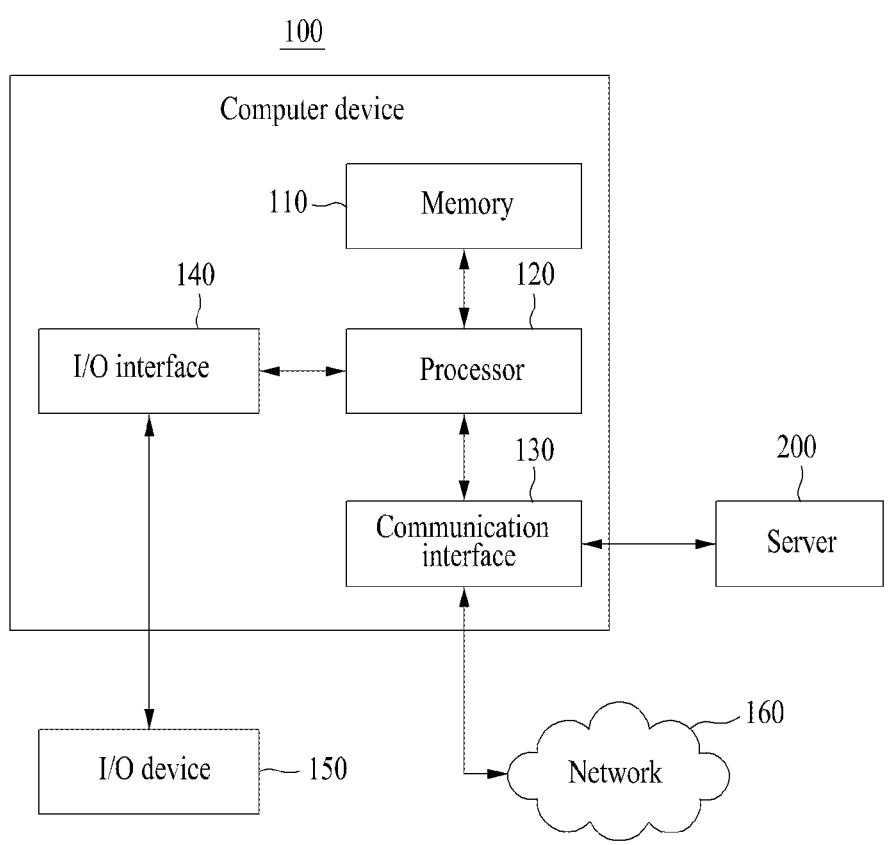
FIG. 2 is a diagram illustrating a computer system and a server for providing a route guidance method using an AR view according to an example embodiment.

FIG. 2 is a diagram illustrating a computer system and a server for providing a route guidance method using an AR view according to an example embodiment.

The user terminal 100 of FIG. 1 according to example embodiments may be implemented through the computer system 100 of FIG. 2. For example, a computer program for implementing the method of example embodiments may be installed and executed on the computer system 100 and the computer system 100 may perform the route guidance method according to example embodiments under the control of the executed computer program.

The route guidance method according to example embodiments may be performed through a personal computer (PC)-based program or an application dedicated for a mobile terminal. For example, the route guidance method according to example embodiments may be implemented in a form of a program that independently operates or may be configured in an in-app form of a specific application to be operable on the specific application. This specific application may be installed on the computer system 100 and may provide an AR-based route guidance, thereby performing the route guidance method of an example embodiment.

The computer system 100 refers to an electronic device and may be a smartphone capable of installing and executing an application or program, as shown in FIG. 1, and a device similar thereto. Also, the computer system 100 may be a personal computer (PC), a notebook computer (laptop computer), a laptop computer, a tablet, an Internet of Things (IoT) device, or a wearable computer.

Referring to FIG. 2, the computer system 100 may include a memory 110, a processor 120, a communication interface 130, and an input/output (I/O) interface 140 as components for performing the route guidance method.

The memory 110 may include a permanent mass storage device, such as random access memory (RAM), read only memory (ROM), and a disk drive as a computer-readable recording medium. Here, the permanent mass storage device, such as ROM and a disk drive, may be included in the computer system 100 as a permanent storage device separate from the memory 110. Also, an OS and at least one program code may be stored in the memory 110. Such software components may be loaded to the memory 110 from another computer-readable record medium separate from the memory 110. The other computer-readable recording medium may include a computer-readable recording medium, such as a floppy drive, a disk, a tape, a DVD/CD-ROM drive, a memory card, etc. According to other example embodiments, the software components may be loaded to the memory 110 through the communication interface 130 instead of the computer-readable recording medium. For example, the software components may be loaded to the memory 110 of the computer system 100 based on a computer program installed by files received over a network 160.

The processor 120 may be configured to process instructions of a computer program by performing basic arithmetic operations, logic operations, and I/O operations. The instructions may be provided from the memory 110 or the communication interface 130 to the processor 120. For example, the processor 120 may be configured to execute received instructions in response to a program code stored in the storage device, such as the memory 110.

That is, the processor 120 may manage components of the computer system 100 and may execute a program or an application used by the computer system 100. For example, the processor 120 may be configured to execute an application for performing the route guidance method of the example embodiment and to process data received from the server 200 to provide route guidance. Also, the processor 120 may process an arithmetic operation required for execution of the program or the application and processing of data, and may include at least one processor of the computer system 100 or at least one core within the processor.

The communication interface 130 may provide a function for communication between the computer system 100 and another computer system (not shown) (over the network 160. For example, the processor 120 of the computer system 100 may transfer a request or an instruction created based on a program code stored in the storage device such as the memory 110, data, a file, etc., to the other computer system over the network 160 under the control of the communication interface 130. Inversely, a signal or an instruction, data, a file, etc., from the other computer system may be received at the computer system 100 through the communication interface 30 of the computer system 100. For example, a signal or an instruction, data, etc., received through the communication interface 130 may be transferred to the processor 120 or the memory 110, and a file, etc., may be stored in a storage medium (e.g., the permanent storage device) further includable in the computer system 100. For example, the communication interface 130 may be a hardware module, such as a network interface card, a network interface chip, and a networking interface port of the computer system 100, or a software module, such as a network device driver or a networking program.

The I/O interface 140 may be a device used for interfacing with an I/O device 150. For example, an input device of the I/O device 150 may include a device, such as a microphone, a keyboard, a mouse, etc., and an output device of the I/O device 150 may include a device, such as a display, a speaker, etc. As another example, the I/O interface 140 may be a device for interfacing with an apparatus in which an input function and an output function are integrated into a single function, such as a touchscreen. The I/O device 150 may be configured as a single device with the computer system 100.

Also, according to other example embodiments, the computer system 100 may include greater number of components than those shown of FIG. 2. For example, the computer system 100 may be configured to include at least a portion of I/O devices connected to the I/O interface 140 or may further include other components, such as a transceiver, a global positioning system (GPS) module, a camera, various types of sensors, and a database. In detail, for example, when the computer system 100 is configured in a form of a mobile device such as a smartphone, the computer system 100 may be implemented to further include various components, such as a camera, an acceleration sensor or a gyro sensor, various types of physical buttons, a button using a touch panel, an I/O port, and a vibrator for vibration, which are generally included in the mobile device.

The server 200 may be an electronic device that provides information/data related to route guidance for the computer system 100 through communication with the computer system 100. The server 200 may include a database as a device configured to store and maintain data for generating a route and guidance information on the route, or may communicate with such database. For example, the server 200 may be a map server that provides a digital map (3D map and/or 2D map). The server 200 may include at least one computer system. The computer system included in the server 200 may include components similar to those of the computer system 100 and repeated description related thereto is omitted.

In an example embodiment, when providing route guidance through an AR view, the user terminal 100 may augment and display content in a video as guidance information based on data and/or information provided from the server 200 through communication with the server 200.

In the following description, example embodiments are described based on the computer system 100 corresponding to the user terminal 100 for clarity of description and description related to communication with the server 200 and an operation on the side of the server 200 may be briefly made or omitted.

Also, in the following description, for clarity of description, operations performed by a component of the computer system 100 (or the server 200) (e.g., a processor) may be described to be performed by the computer system 100 (or, the server 200).

Description related to technical features made above with reference to FIG. 1 may be applied to FIG. 2 as is and further description is omitted.

Figure 3:
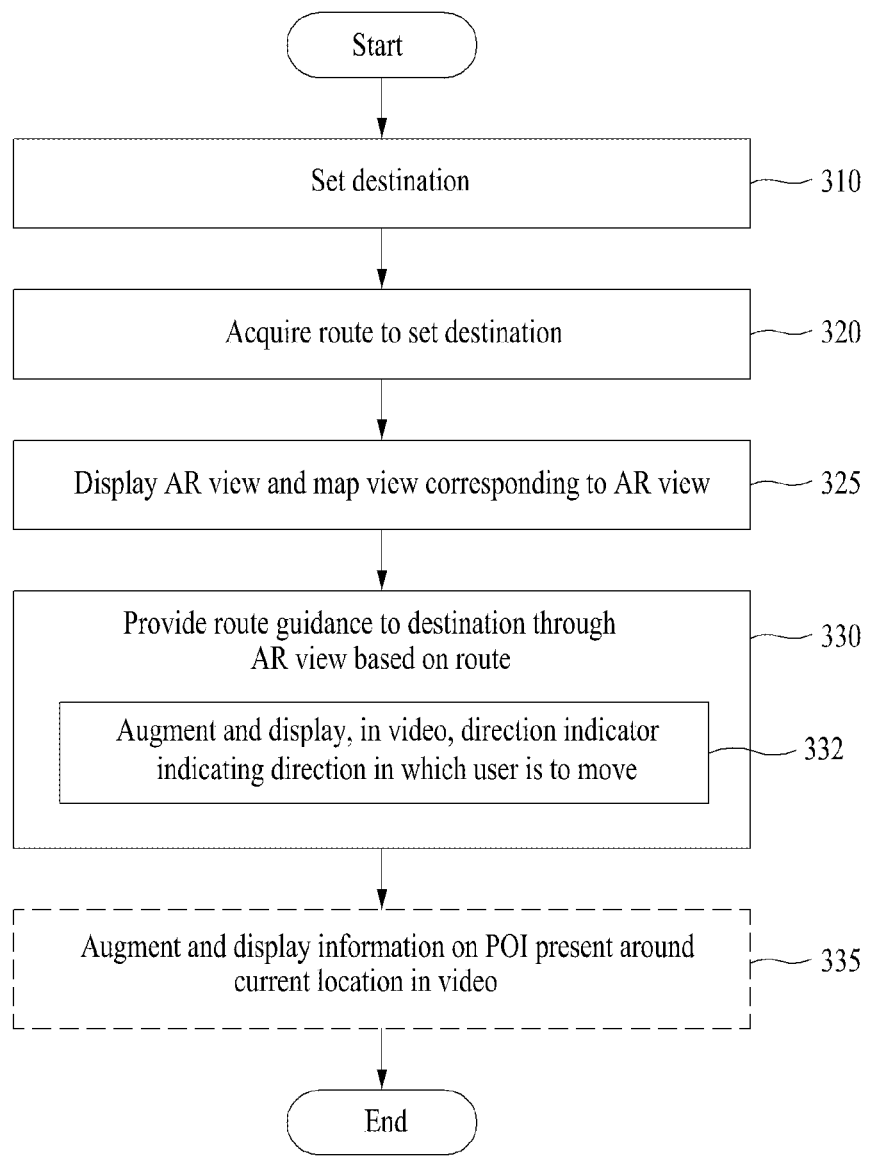
FIG. 3 is a flowchart illustrating a route guidance method using an AR view according to an example embodiment.

FIG. 3 is a flowchart illustrating a route guidance method using an AR view according to an example embodiment.

A route guidance method performed by the computer system 100 is described with reference to FIG. 3. The computer system 100 may be the user terminal 100 described above with reference to FIG. 1 and thus, in the following description, an example embodiment is described using the term "user terminal 100" instead of using the computer system 100.

In operation 310, the user terminal 100 may set a destination. Setting of the destination may be performed through a user interface provided from an application that provides a route guidance service by the user of the user terminal 100. Also, the user terminal 100 may set a starting point. Similar to the destination, the starting point may be set by the user through a user interface. Alternatively, the current location of the user (user terminal 100) may be set as the starting point.

In operation 320, the user terminal 100 may acquire a route from the starting point to the set destination. The route to the set destination may be generated by the server 200, and the user terminal 100 may acquire the route generated by the server 200. Acquisition of the route from the server 200 may refer to receiving information/data that represents the route from the starting point to the destination. The acquired route may include at least one of a shortest distance route, a minimum time route, and an optimal route from the starting point to the destination. When a plurality of routes is generated and provided to the user terminal 100, the user terminal 100 may provide the selected route based on a selection received from the user.

At least a portion of an operation required for generation of the route may be performed by the user terminal 100.

In operation 330, the user terminal 100 may provide route guidance from the starting point to the destination through an AR view that includes a live video captured by a camera of the user terminal 100, based on the route acquired in operation 320. That is, the user may move from the starting point to the destination by referring to virtual guidance information that is augmented and displayed in the video of the AR view. As in operation 332, the user terminal 100 may augment and display, in the video, a virtual direction indicator indicating a direction in which the user needs to move to reach the destination. The user may recognize a direction and a turn to move through the direction indicator that is augmented and displayed in the live video and may move from the starting point to the destination accordingly.

In augmenting and displaying the direction indicator in the video, the user terminal 100 may display the direction indicator in an area corresponding to the surface of the route (e.g., floor, street, ground, etc.) and, when the user is required to make a turn, display an additional direction indicator indicating the turn above the surface. For example, referring to FIG. 1, a direction indicator indicating a direction in which the user needs to move along the route may be displayed in the video of the AR view and an additional direction indicator indicating that the user needs to turn left may be displayed above the surface of the route. Therefore, the user may more clearly identify the turn required for moving to the destination.

The route acquired in operation 320 may include a plurality of nodes. Also, the route may include a link that connects two nodes among the nodes.

Figure 7:
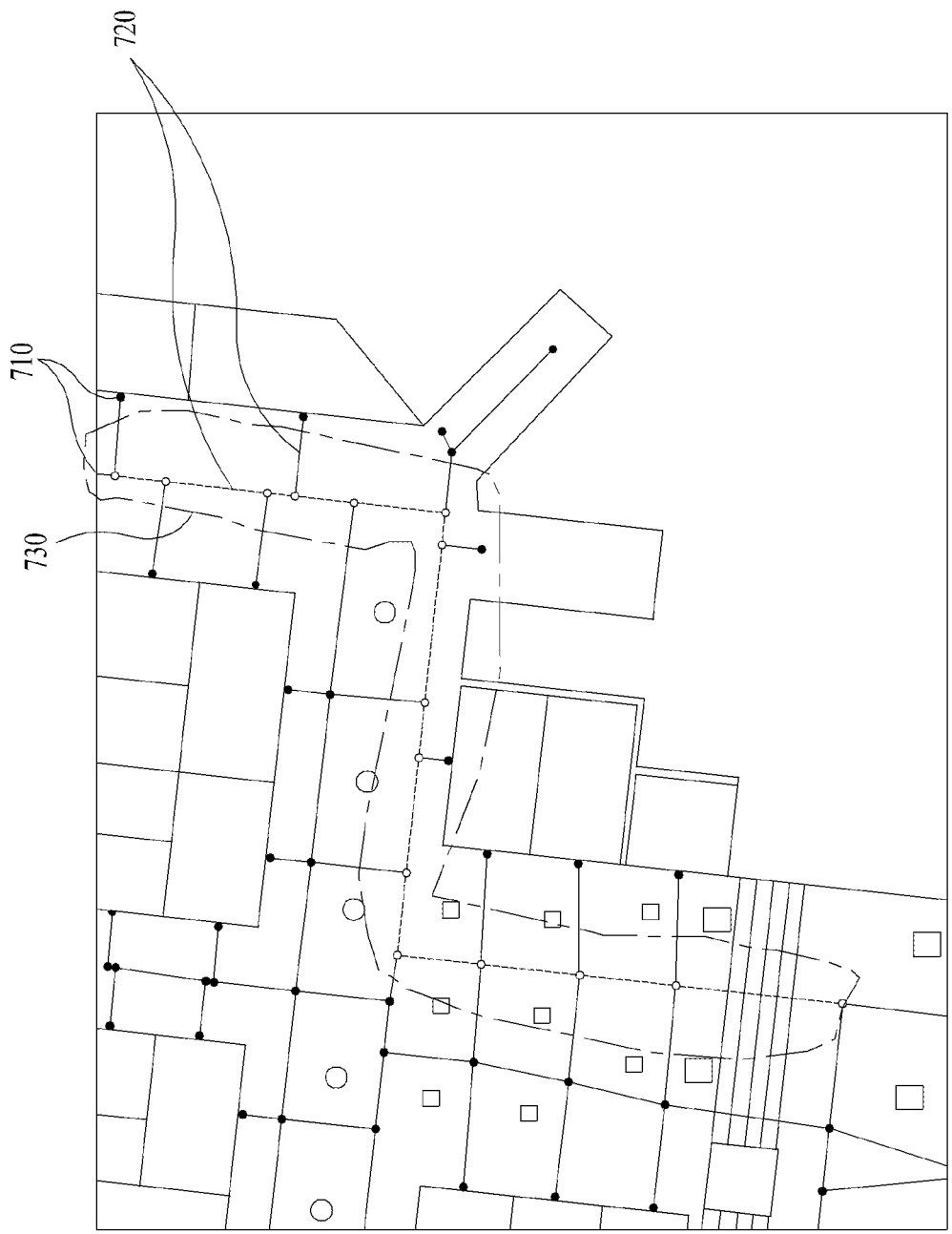
FIG. 7 illustrates a route including a node and a link according to an example.

In this regard, FIG. 7 illustrates a route including a node and a link according to an example. FIG. 7 illustrates a space that includes a plurality of nodes and links connecting the nodes. The illustrated space may be an indoor space (e.g., Gangnam station) or a space representing a specific outdoor area.

Referring to FIG. 7, a plurality of nodes 710 may be defined in the space. Also, each of links 720 may be defined as a line that connects two of the nodes 710. The nodes 710 and the links 720 may be defined by the server 200. For example, each of the nodes 710 may be mapped in the space by an administrator of the server 200. Alternatively, the server 200 may automatically map at least a portion of the nodes 710 by generating a mesh (including nodes) corresponding to the space. Predetermined information may be registered to at least a portion of the nodes 710 and/or at least a portion of the links 720. The predetermined information may include information required to augment virtual content in the live video as guidance information related to a corresponding node or link.

A route 730 may be an example of the route acquired in operation 320. The route 730 may be generated by connecting a node corresponding to a starting point and a node corresponding to a destination. In the illustrated example, nodes and links included in the route 730 are marked to be distinguished from the other nodes and links which are not included in the route.

For example, a node may be mapped to a corner or an intersection within the space and thus, a point at which the user is required to make a turn in the acquired route 730 may include a node. For example, the aforementioned additional direction indicator may be displayed at a location in the video corresponding to a node (at a point at which a turn is required). A direction indicator that does not indicate a turn may be displayed at a predetermined interval between nodes in the video.

In an example embodiment, in response to an occurrence of an interaction between the user terminal 100 and a node or a link to which the predetermined information is registered among the nodes or the links included in the route 730, content related to the corresponding predetermined information may be augmented and displayed in the video as guidance information.

A detailed method of augmenting and displaying guidance information in the video is further described with reference to the following drawings.

Meanwhile, as in operation 325, the user terminal 100 may display a map view that includes a map matched to the video of the AR view with the AR view, to provide route guidance to the destination. The map view may include the route and the current location of the user terminal 100. The map view may be a 2D map or a 3D map.

Figure 10:
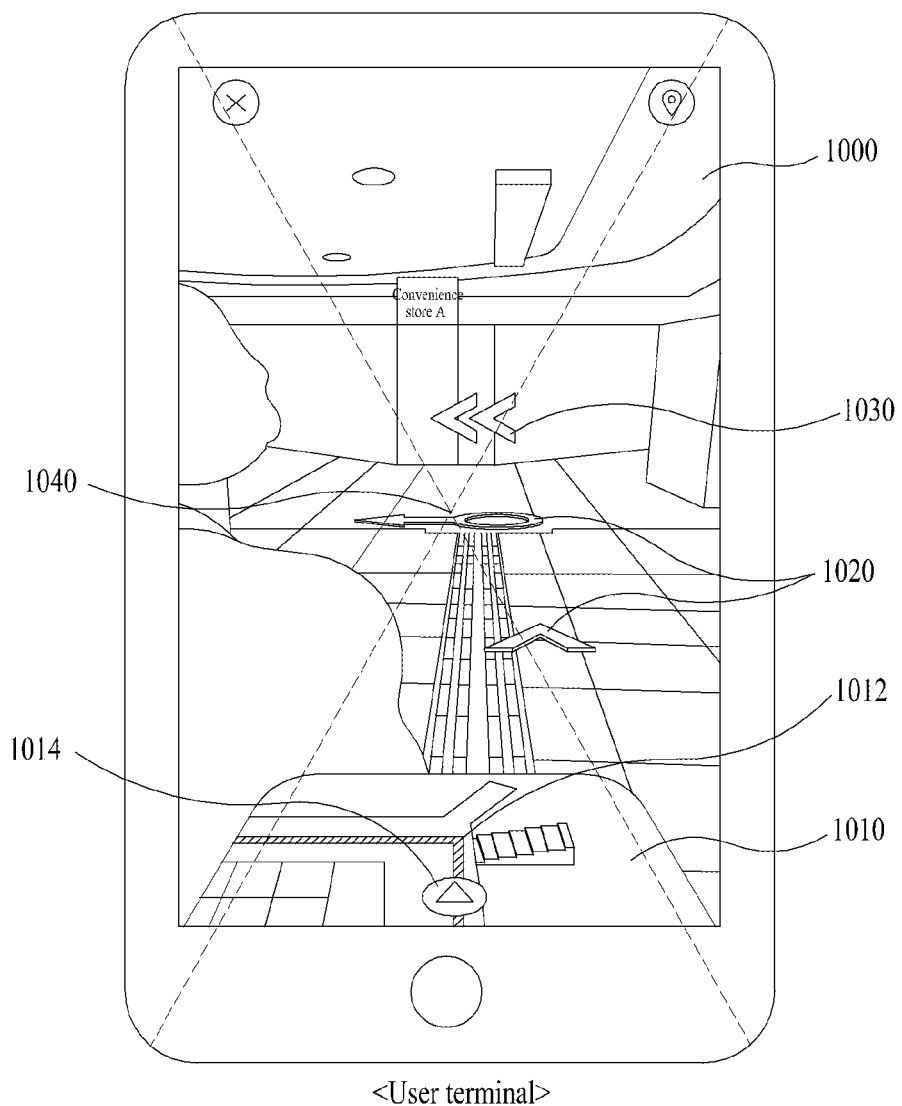
FIGS. 10 and 13 illustrate a screen of a user terminal for route guidance using an AR view according to an example.

In this regard, FIG. 10 illustrates a screen 1000 of the user terminal 100 for route guidance using an AR view according to an example.

Referring to FIG. 10, a map view 1010 may be displayed at a lower end of the screen of the user terminal 100. The map view 1010 may be a 3D map and may be tilted to three-dimensionally identify objects on a map, instead of a map in a plan view form as illustrated.

A tilted angle of the map view 1010 may be determined based on a location of a vanishing point 1040. Also, as illustrated in FIG. 10, the map view 1010 may be displayed in a trapezoidal shape (a trapezoidal shape in which two vertices are rounded). Extension lines of two non-parallel sides of the map view 1010 in the trapezoidal shape may intersect at the vanishing point of the video.

The map displayed on the map view 1010 may be zoomed out more than the video of the AR view. That is, the map view 1010 may provide information on a wider area than the video. The user may easily find the destination by referring to the map view 1010 with the video of the AR view.

A route 1012 and the current location 1014 of the user terminal 100 may be displayed in the map view 1010.

Also, as described above, a direction indicator 1020 indicating a direction in which the user needs to move may be augmented and displayed in the video of the AR view. The direction indicator 1020 may be displayed in an area corresponding to the surface of the route. Also, an additional direction indicator 1030 indicating a turn in the route 1012 may be augmented and displayed in the video. The additional direction indicator 1030 may be displayed above the surface. For example, the additional direction indicator 1030 may be displayed above the vanishing point 1040 (or below or at a location of the vanishing point 1040). Alternatively, the additional direction indicator 1030 may be displayed at a preset height in the video.

Meanwhile, as in operation 335, the user terminal 100 may augment and display information on a point of interest (POI) present around the current location of the user (user terminal 100) in the video as the user terminal 100 moves toward the destination based on the route acquired in operation 320.

The POI may represent a facility, for example, a restaurant, a store, a government office, other features (in the map), and the like. Information on the POI may include information on a product, a service, an event, and the like, provided from the corresponding POI. Also, information on the POI may include unique information related to the corresponding POI (e.g., under construction, in operation, end of business, closure of business, etc.).

Information on the POI may be tagged information by including z-axis location information (e.g., z-axis coordinates) for an object corresponding to the POI included in the map that represents a 3D space corresponding to the periphery of the current location of the user terminal 100. That is, information on the POI may be information mapped to the object corresponding to the POI in the map that represents the 3D space and may be mapped to the object to include the z-axis location information. The map that represents the 3D space may be, for example, a 3D point cloud map.

A location at which information on the POI is displayed in the video may be determined based on such z-axis location information. Therefore, information on the POI may be augmented and displayed in the video to reflect a 3D location of the corresponding POI (i.e., reflect 3D geometry of the POI) in the video.

For example, when a POI is present on a second floor of a building, information on the corresponding POI may be mapped to the second floor of the building that includes the corresponding POI included in the map that represents the 3D space and the user terminal 100 may display information on the POI on the second floor of the building when the building is displayed through the video of the AR view. When information on the POI includes, for example, "Under construction," the user terminal 100 may augment and display, in the video, information requesting attention from the user (when passing by) (e.g., "Under construction. Please be careful." or "Please check surrounding traffic information") with information indicating "Under construction."

The POI at which information on the POI is displayed may be a POI previously visited by the user or a POI pre-registered (e.g., as a favorite or a target of interest) by the user.

Figure 18:
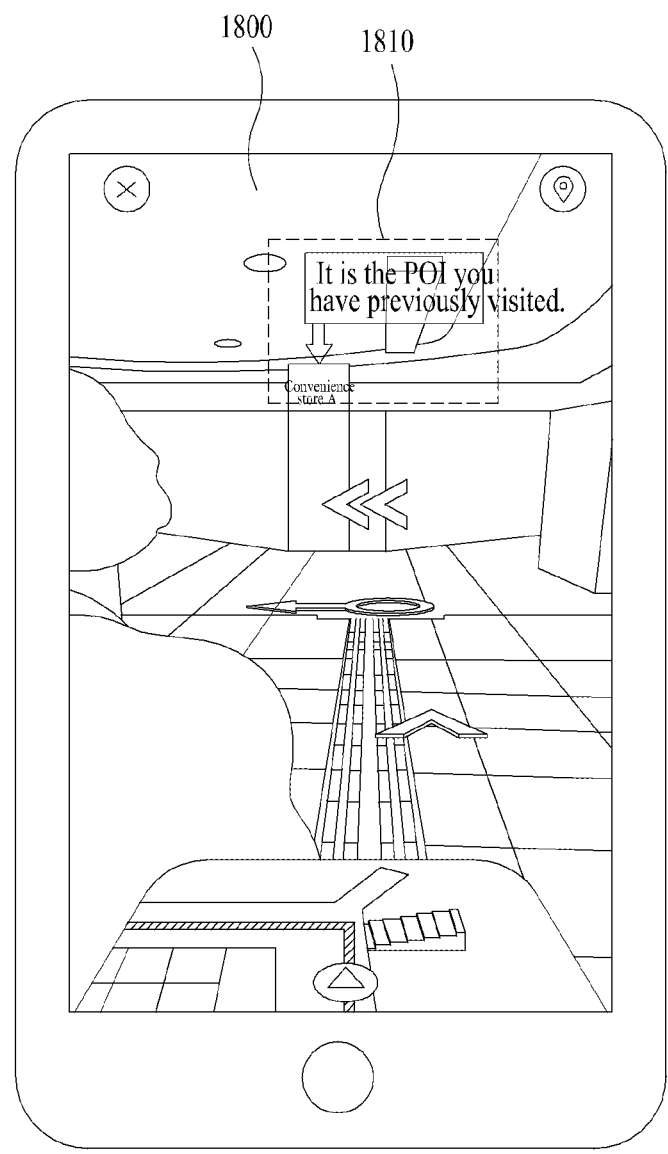
FIG. 18 illustrates a method of augmenting and displaying information on a point of interest (POI) in a video of an AR view in providing route guidance according to an example.

In this regard, FIG. 18 illustrates a method of augmenting and displaying information on a POI in a video of an AR view in providing route guidance according to an example. FIG. 18 illustrates an example of a screen 1800 of the user terminal 100 for route guidance using the AR view.

Referring to FIG. 18, POI information 1810 on a POI corresponding to convenience store A may be augmented and displayed in the video. The POI information 1810 may include information on products, services, events, etc., provided from the POI and may include unique information related to the POI. Also, the POI information 1810 may include information indicating that the corresponding POI was previously visited by the user (or information indicating that the corresponding POI is favorited by the user).

The POI information 1810 may be augmented and displayed in the video by reflecting a 3D location of the corresponding POI. For example, as illustrated, the POI information 1810 may be overlappingly displayed at a location of a signboard of actual convenience store A. Depending on example embodiments, the user may identify more discrete and realistic information on the POI through the AR view.

Although not illustrated, information on the POI may include information on an exit/direction for moving to the POI. The POI may be a facility such as a store or may be entrance or exit, a toilet, or an automated transaction machine (ATM). As another example, information on the POI may be augmented and displayed in the video, such as "My favorite restaurant 'OO restaurant' is located 5 m to the left/right." Here, information of the POI may be displayed in a direction in which the corresponding POI is located on the screen.

Description related to technical features made above with reference to FIGS. 1 and 2 may apply to FIGS. 3, 7, 10, and 18 and thus, further description is omitted.

Figure 4:
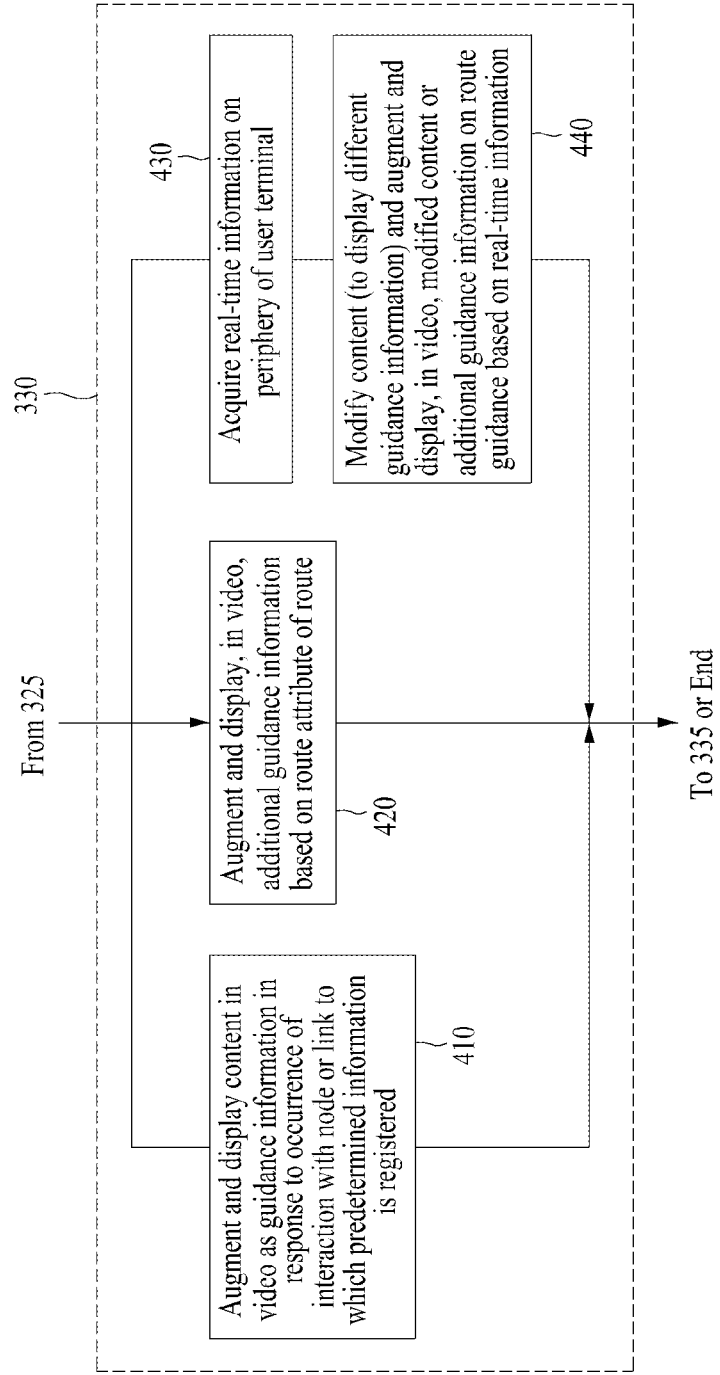
FIGS. 4 and 5 are flowcharts illustrating a method of providing route guidance by augmenting and displaying guidance information in a video of an AR view according to an example.

FIG. 4 is a flowchart illustrating a method of providing route guidance by augmenting and displaying guidance information in a video of an AR view according to an example.

The method of providing the route guidance from the starting point to the destination through the AR view in operation 330 is further described with reference to FIG. 4.

In operation 410, in response to an occurrence of an interaction between the user terminal 100 (i.e., the user) and a node to which predetermined information is registered among a plurality of nodes included in a route and a link to which the predetermined information is registered among links included in the route as the user terminal 100 moves toward a destination, the user terminal 100 may augment and display content related to the corresponding predetermined information in the video as guidance information. For example, the user terminal 100 (or the server 200) may determine whether the interaction between the user terminal 100 and the node or the link to which the predetermined information is registered has occurred. When the interaction is determined to have occurred, the user terminal 100 may augment and display the content related to the predetermined information registered to the corresponding node or link in the video as guidance information.

The interaction between the user terminal 100 and the node or the link may include a specific action by the user terminal 100. For example, when the user terminal 100 approaches within a predetermined distance from a location corresponding to the node or the link to which the predetermined information is registered (i.e., a location of the real world corresponding to the node or the link) or arrives at the corresponding location (or passes the corresponding location), the interaction may be determined to have occurred. As described above, a condition for determining the occurrence of the interaction may be preset to each node or link. For example, when "action range" representing the approaching range of the user terminal 100 for outputting content is preset to each node or link and the user terminal 100 enters the preset action range, content related to predetermined information registered to a corresponding node or link may be displayed in the video.

The content may be displayed at a location related to the node or the link to which the predetermined information is registered in the video. The location related to the node or the link may be the aforementioned location corresponding to the node or the link (i.e., the location of the real world corresponding to the node or the link) or a location before or a location after a predetermined distance from the location corresponding to the node or the link. The location related to the node or the link may represent a location on the screen of the user terminal 100. Therefore, the content may be related to the corresponding node or link on the screen, and, for example, may be displayed at a predetermined location, such as side or center of the screen around the corresponding node or link or before arriving at the corresponding node or link.

The content may include instruction contents capable of guiding an action of the user in a destination search process in association with the node or the link to which the predetermined information is registered. For example, the content may include at least one of information on a direction in which the user needs to move and information on an action to be taken by the user.

Information on the action to be taken by the user, included in the content, may include at least one of passing through a ticket gate, passing through an entry gate, passing through an exit gate, moving to stairs (or a floor), avoiding obstacles, using an elevator, and preparing a ticket or fare.

Therefore, when the route guidance is provided through the AR view, the user may clearly be aware of an action to be taken to move to the destination around a specific node or link. For example, when the user arrives in front of a ticket gate (i.e., around a node corresponding to the ticket gate), the user terminal 100 may display a guidance, such as "Pass the ticket gate" and/or "Prepare your ticket or fare."

Also, when augmenting and displaying the content in the video in operation 410, the user terminal 100 may modify the content to display different guidance information as the user terminal 100 approaches the node or the link to which the predetermined information is registered and may augment and display the modified content in the video. That is, according to a direction in which the user approaches the node or the link to which the predetermined information is registered, different guidance information may be displayed. Therefore, guidance information suitable for a movement direction of the user with respect to the node or the link may be displayed.

For example, in a situation in which the user arrives around the node corresponding to the ticket gate, when the user is moving in a direction for entering through the ticket gate, the user terminal 100 may display guidance information, such as "Go through the ticket gate and take the subway" and/or "Prepare your ticket/fare." When the user is moving in a direction for exiting through the ticket gate, the user terminal 100 may display guidance information, such as "Go out through the ticket gate" in the video. Also, although the user arrives around a node corresponding to an entrance, the user terminal 100 may display different guidance information in the video depending on whether the user moves in an entry direction or an exit direction.

In this regard, a content display method of an example embodiment is further described with reference to FIGS. 8, 9, 11, and 12.

Figure 8:
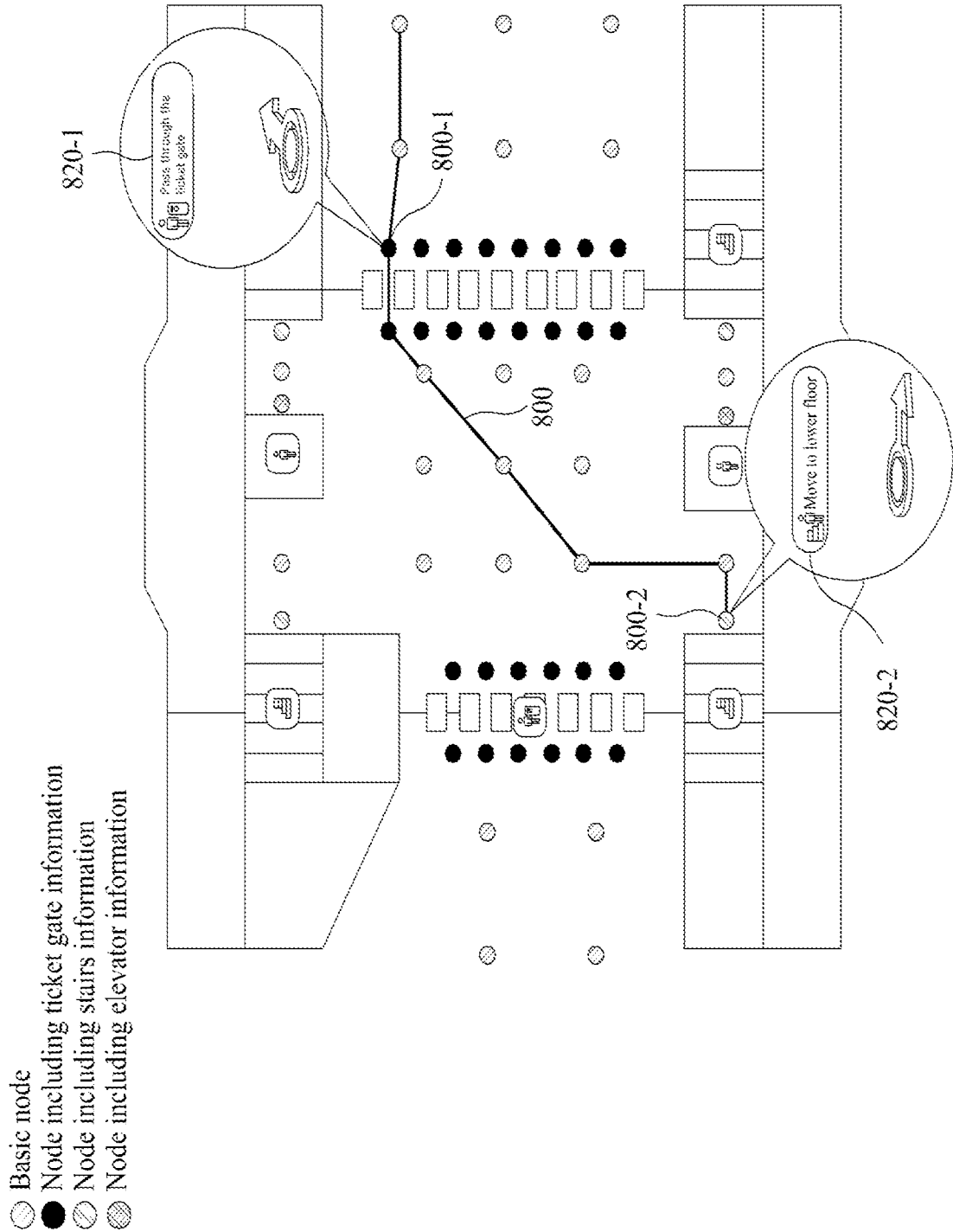
FIG. 8 illustrates a node and content related to information registered to the node according to an example.

FIG. 8 illustrates a node and content related to information registered to the node according to an example.

FIG. 8. illustrates a route 800 that includes nodes and links.

Referring to FIG. 8, each of the nodes may be a basic node, a node including ticket gate information, a node including stairs information, or a node including elevator information. The basic node may be a node to which information for displaying guidance information (content) is not registered. The node including ticket gate information may be a node to which information for displaying guidance information related to a ticket gate is registered. The node including stairs information may be a node to which information for displaying guidance information related to stairs is registered. The node including elevator information may be a node to which information for displaying guidance information related to an elevator is registered.

Predetermined information for displaying content is registered to a node 800-1 and a node 800-2. The node 800-1 may include ticket gate information as the predetermined information and the node 800-2 may include stairs information as the predetermined information.

In a situation in which the user moves along the route 800, when the user approaches the node 800-1, the user terminal 100 may augment and display content 820-1 (i.e., "Pass through the ticket gate") in the video as guidance information. When the user approaches the node 800-2, the user terminal 100 may augment and display content 820-2 (i.e., "Move to a lower floor") in the video as guidance information.

Also, as illustrated, the user terminal 100 may augment and display, in the video, a direction indicator indicating a direction in which the user needs to move.

The content 820-1 or 820-2 may be displayed before approaching the corresponding node 800-1 or 800-2 (e.g., when passing a previous node). A display location or time of content may be determined based on an action range value defined in the node 800-1 or 800-2.

Figure 9:
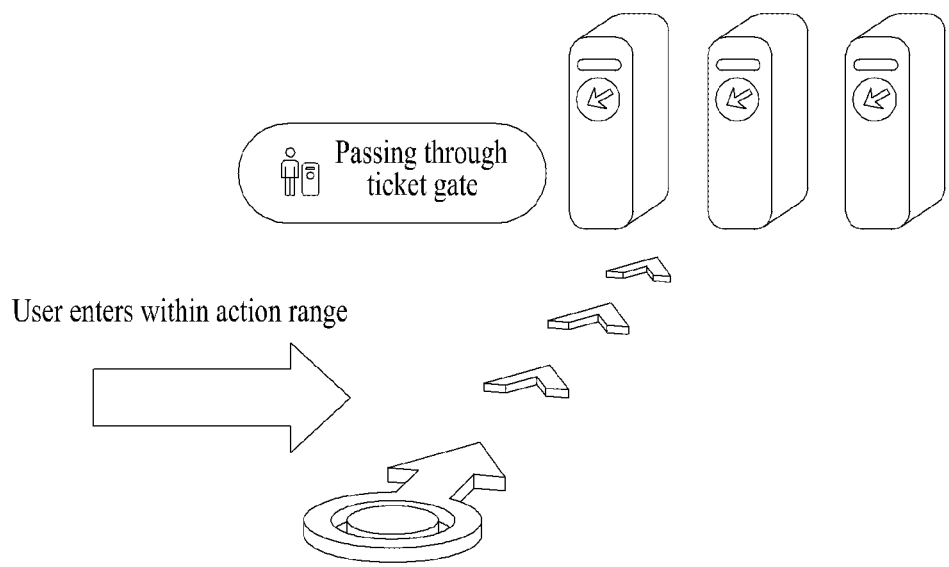
FIGS. 9 and 12 illustrate a method of augmenting and displaying content related to information registered to a node or a link in a video according to an example.
Figure 12:
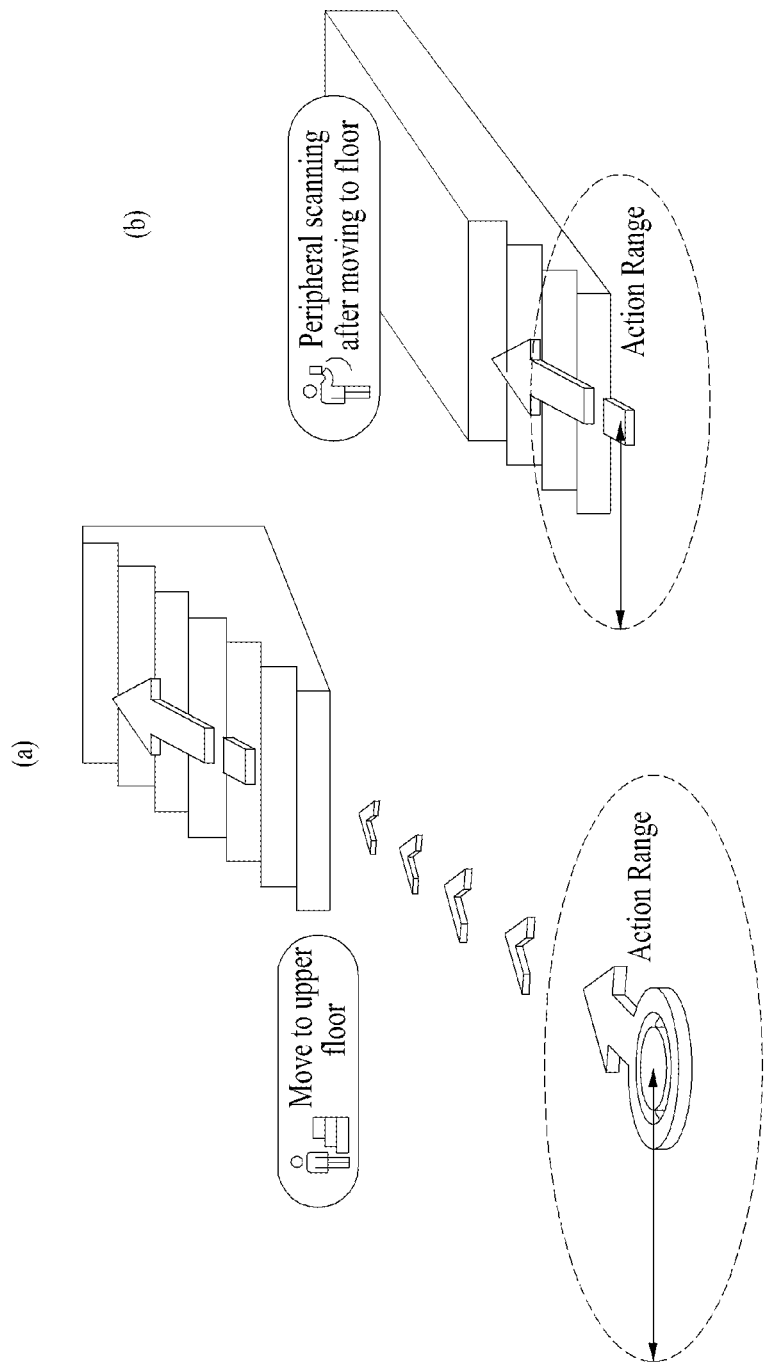

FIGS. 9 and 12 illustrate a method of augmenting and displaying content related to information registered to a node or a link in a video according to an example.

Referring to an AR view of FIG. 9, in a case in which a user enters within an action range defined for a node corresponding to a ticket gate, the user terminal 100 may augment and display content corresponding to guidance information (passing through the ticket gate) in the video. Also, as illustrated, the user terminal 100 may augment and display, in the video, a direction indicator indicating a direction in which the user needs to move.

Referring to an AR view of FIG. 12, when the user enters within the action range defined for a node corresponding to stairs, the user terminal 100 may augment and display content corresponding to guidance information ("Move to an upper floor" (a) or "Peripheral scanning after moving to the floor" (b)). Also, as illustrated, the user terminal 100 may augment and display, in the video, a direction indicator indicating a direction in which the user needs to move.

Figure 11:
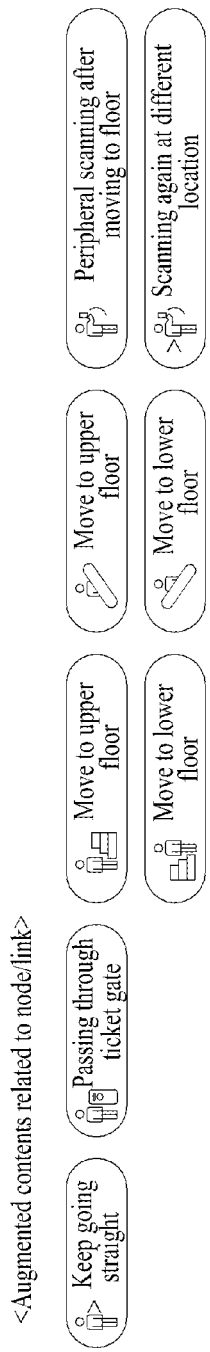
FIG. 11 illustrates content related to information registered to a node or a link according to an example.

FIG. 11 illustrates content related to information registered to a node or a link according to an example. Referring to FIG. 11, content augmented and displayed in a video as guidance information on the node or the link may include text information and an image that explains the corresponding text.

In an example embodiment, more detailed route guidance may be provided to the user by augmenting and displaying not only the direction indicator but also content as illustrated, in the video of the AR view.

Meanwhile, a location at which the content is augmented and displayed in the video may be preset as a location at which the user may easily identify the content. For example, the location at which the content is augmented and displayed in the video may be determined based on a location of a vanishing point of the video. Alternatively, such content may be augmented and displayed at a fixed location of an upper right end or a lower left end of the video. The location at which the content is augmented and displayed in the video may be set by the user of the user terminal 100. Alternatively, the content may be displayed at a preset height in the video. Alternatively, the location at which the content is augmented and displayed in the video may be determined in a similar manner to the location at which the additional direction indicator 1030 indicating the turn is augmented and displayed, which is described above with reference to FIG. 10.

Hereinafter, a route guidance method using route attribute-based additional guidance information is described.

In operation 420, as the user terminal 100 moves toward the destination based on the route acquired in operation 320, the user terminal 100 may augment and display, in the video, (additional) guidance information based on a route attribute of the route. That is, according to an example embodiment, in addition to guidance information according to a characteristic of each node or link included in the route (the aforementioned content related to the predetermined information that is registered to the node or the link), the user terminal 100 may augment and display guidance information that considers a characteristic of the route itself in the video.

When the user is required to go straight for a predetermined first distance or more from a current location, the user terminal 100 may augment and display, in the video, first additional guidance information for guiding the user to continue going straight. For example, when the acquired route includes a link that represent a straight line over the predetermined distance or more (i.e., when links that connect nodes included in the route represent a straight line over the predetermined distance or when the links include a straight section with a length corresponding to the predetermined distance or more), the user terminal 100 may augment and display, in the video, the first additional guidance information that guides the user to "continue going straight." In the route being guided, the first additional guidance information may be augmented and displayed in the video until the straight section ends. The first additional guidance information may include information indicating a length of the straight section. Information indicating the length of the straight section may vary as the user moves in the straight section.

Through the first additional guidance information, the user may verify in advance that the user is required to go straight by a predetermine distance or more to move to the destination.

Also, when the user is required to make a turn a predetermined first number of times within a predetermined second distance from the current location, the user terminal 100 may augment and display, in the video, second additional guidance information that requests to maintain the AR view. For example, when the acquired route includes a section including links that represent turns of the first number of times or more (a length corresponding to the second distance or less), the user terminal 100 may augment and display, in the video, the second additional guidance information that requests the user to maintain the AR view without terminating the AR view. That is, when a relatively large number of turns are included in a relatively short section within the route, the user terminal 100 may determine the corresponding section as a complex route and may guide the user to maintain the AR view.

Through the second additional guidance information, the user may verify in advance entry into the complex section that requires a large number of turns in a short section and may be provided with guidance for the corresponding section while maintaining the AR view.

Also, when the user is required to make a turn a predetermined second number of times or more within a predetermined third distance from the current location, the user terminal 100 may augment and display, in the video, third additional guidance information that includes text information for guiding turns of the second number of times. For example, when the acquired route includes a section that includes links representing turns of the second number of times or more (a length corresponding to the third distance or less), the user terminal 100 may guide turns of the corresponding second number of times or more through text information. That is, when a relatively large number of turns are included in a relatively short section within the route, the user terminal 100 may determine the corresponding section as the complex section and may guide the user along the corresponding complex route through the text information. When the third additional guidance information including the text information is displayed in the video, the aforementioned direction indicator may be no longer displayed in the video. The third distance may be set to be equal to or different from the second distance and the second number of times may be set to be equal to or different from the first number of times.

According to situations, the user terminal 100 may augment and display, in the video, at least one of the aforementioned first additional guidance information, second additional guidance information, and third additional guidance information.

In this regard, FIGS. 14 to 17 illustrate a method of augmenting and displaying, in a video of an AR view, guidance information based on a route attribute representing a characteristic of a route according to an example.

Figure 14:
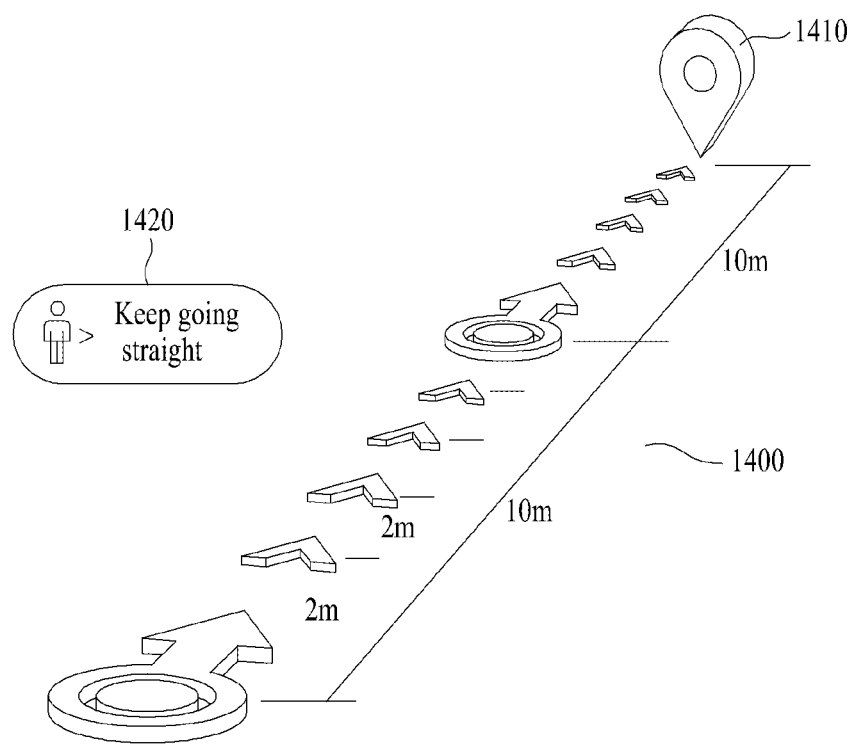
FIGS. 14 to 17 illustrate a method of augmenting and displaying, in a video of an AR view, guidance information based on a route attribute representing a characteristic of a route according to an example.
Figure 17:
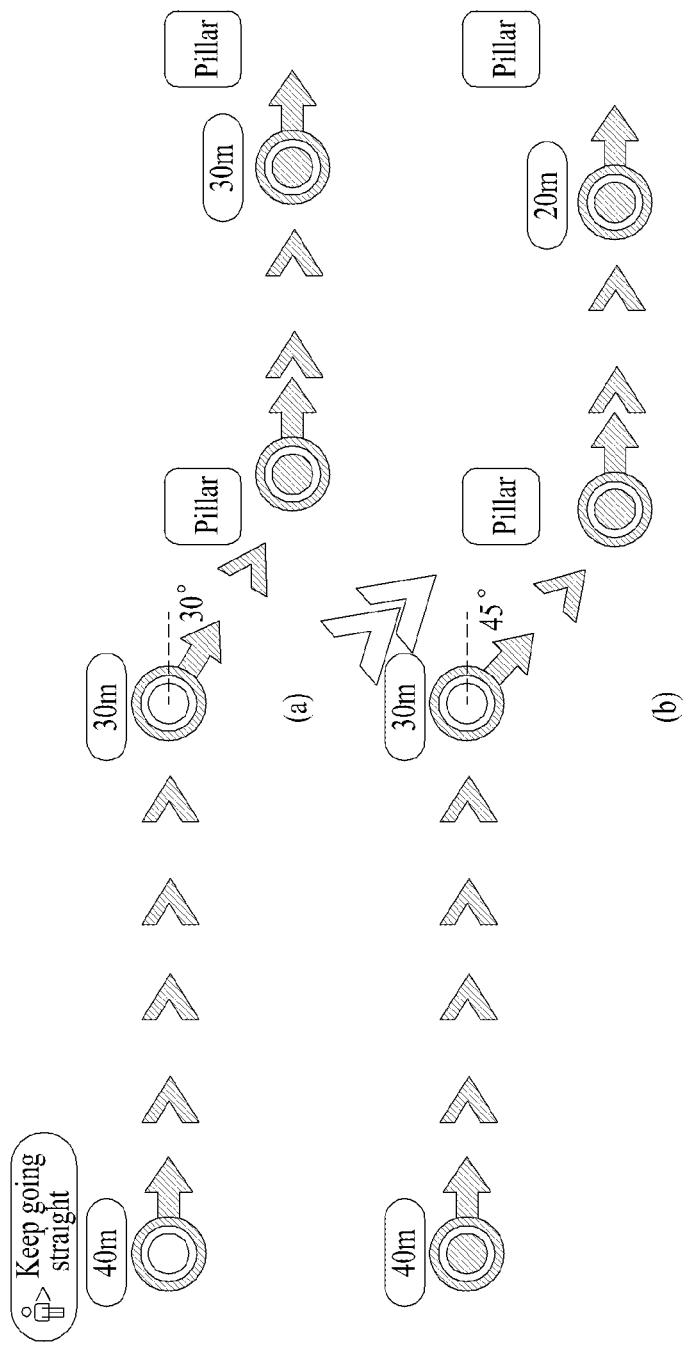

FIGS. 14 and 17 illustrate a method of displaying the aforementioned first additional guidance information.

Referring to FIG. 14, when a route 1400 to a destination 1410 includes a straight link of a predetermined length (e.g., 20 m) or more or includes a straight section with the corresponding predetermined length or more, the user terminal 100 may augment and display first additional guidance information 1420 ("Keep going straight"). In the illustrated example, within the route 1400, nodes may be arranged at intervals of 10 m and direction indicators may be arranged at intervals of 2 m. A link that connects two nodes may have a length of 10 m.

FIG. 17 illustrates a method of displaying first additional guidance information when an obstacle is present within a route.

For example, referring to (a) of FIG. 17, in a case in which a pillar is present as an obstacle within the route, when an angle of a turn required to avoid the obstacle is less than a predetermined value (e.g., 45 degrees), the user terminal 100 may determine that a section including the turn required to avoid the obstacle is a straight section. Therefore, the user terminal 100 may augment and display "Keep going straight" in the video as first additional guidance information upon entering the corresponding straight section.

Here, referring to (b) of FIG. 17, when the angle of the turn required to avoid the obstacle is greater than or equal to the predetermined value (e.g., 45 degrees), the user terminal 100 may determine that the section including the turn required to avoid the obstacle is not a straight section. Therefore, the user terminal 100 may not display the first additional guidance information upon entering the corresponding section.

Figure 15:
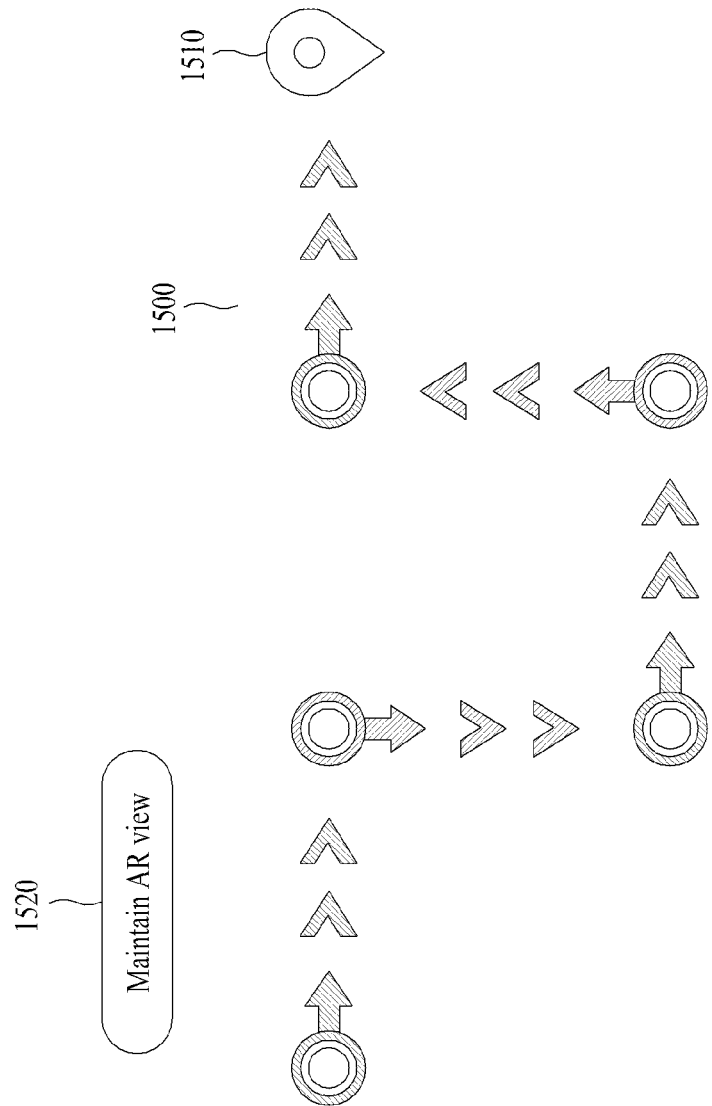

FIG. 15 illustrates a method of displaying the aforementioned second additional guidance information.

Referring to FIG. 15, when a route 1500 to a destination 1510 includes a section (with a predetermined length or less) including turns of a predetermined number of times (e.g., 3 or 4 times) or more, the user terminal 100 may augment and display second additional guidance information 1520 ("Maintain the AR view") in the video. The user may verify the second additional guidance information 1520 augmented and displayed in the video and may be provided with guidance for a complex section including many turns by maintaining the AR view.

Figure 16:
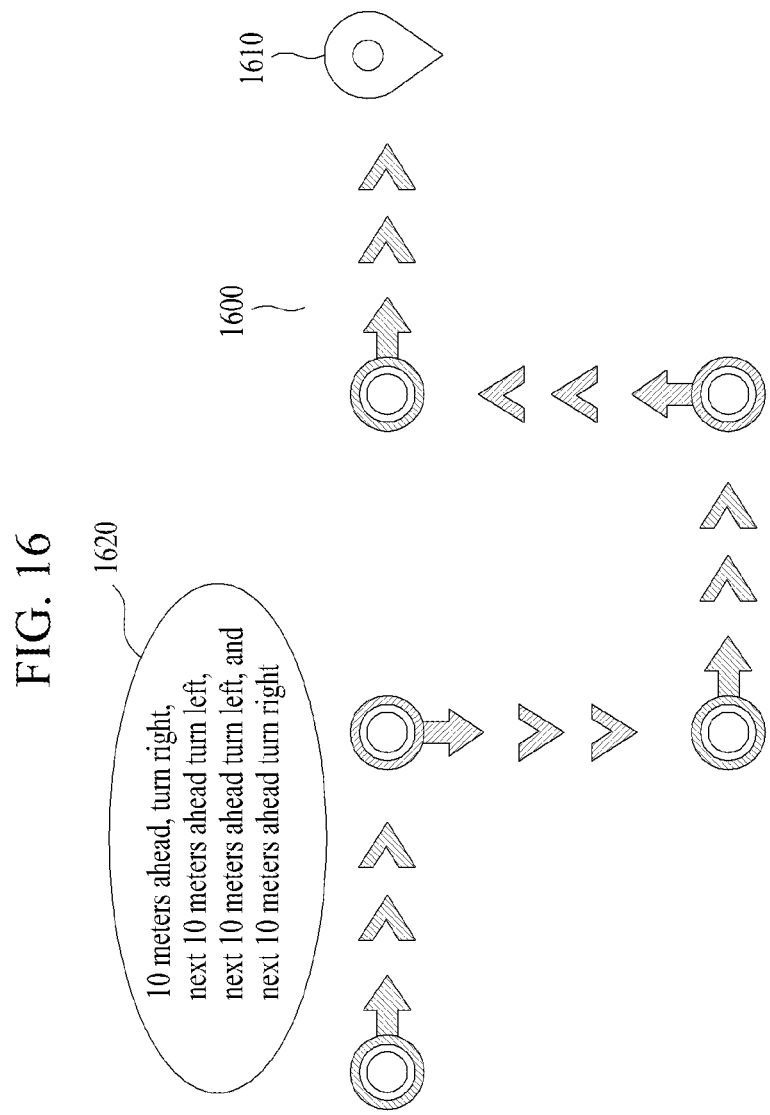

FIG. 16 illustrates a method of displaying the aforementioned third additional guidance information.

Referring to FIG. 16, when a route 1600 to a destination 1610 includes a section (with a predetermined length or less) including turns of a predetermined number of times (e.g., 3 or 4 times) or more, the user terminal 100 may augment and display third additional guidance information 1620 ("10 meters ahead turn right, next 10 meters ahead turn left, next 10 meters ahead turn left, and next 10 meters ahead turn right") in the video. The user may verify the third additional guidance information 1620 augmented and displayed in the video and may be provided with guidance for a complex section including many turns through text information that explains the corresponding turns.

Meanwhile, when augmenting and displaying, in the video, the route attribute-based additional guidance information of operation 420, the user terminal 100 may augment and display information on a POI present around the route in the video as additional guidance information as the user terminal 100 moves toward the destination. The POI on which information is provided may be a POI previously visited by the user or a POI pre-registered (e.g., as a favorite or a target of interest) by the user.

The description related to information on the POI and the method of augmenting and displaying information on the POI in the video, made above with reference to FIGS. 3 and 18 may similarly apply to the description related to information on the POI and the method of augmenting and displaying information on the POI in the video. Therefore, further description is omitted.

Likewise, information on the POI may be augmented and displayed in the video to reflect a 3D location of the corresponding POI in the video (i.e., reflect 3D geometry of the POI).

When the starting point and the destination are present on different floors of an indoor space, the route acquired in operation 320 may include a movement between floors. Here, when augmenting and displaying the route attribute-based additional guidance information of operation 420 in the video, the user terminal 100 may augment and display, in the video, information indicating that the movement between floors is required to move to the destination as additional guidance information when the user terminal 100 is determined to be present on a floor different from that of the destination. Here, the direction indicator indicating a direction in which the user needs to move may not be displayed in the video.

Figure 13:
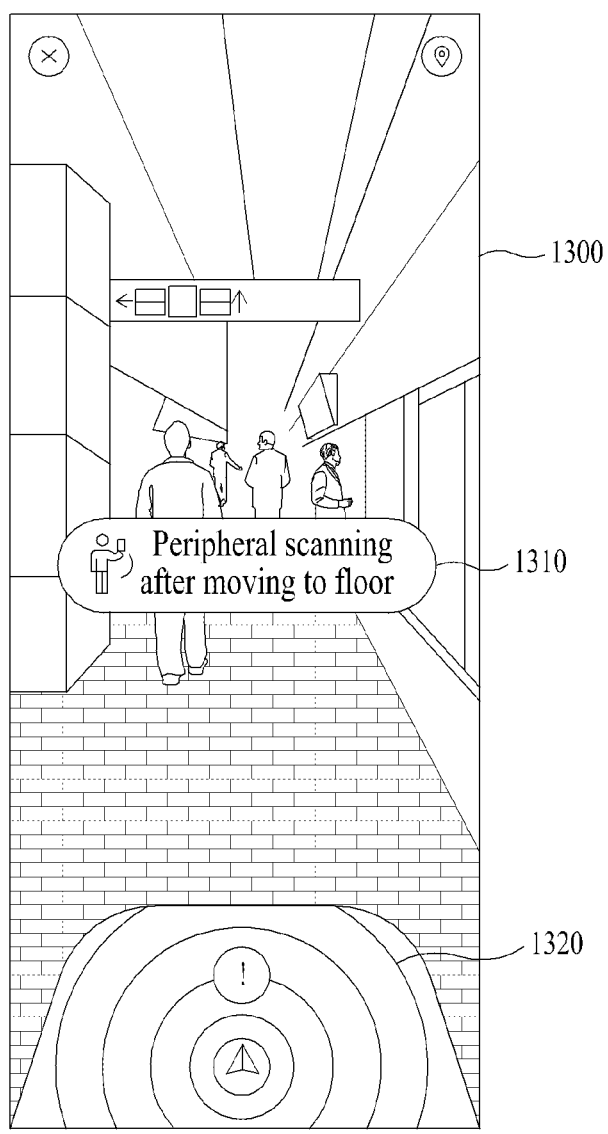

Information indicating that the movement between floors is required may include text information, for example, "Go to the nearest stairs/elevator/escalator." Here, the direction indicator may not be displayed in the video (e.g., refer to FIG. 13). Alternatively, information indicating that the movement between floors is required may include guidance information to the closest stairs, elevator, or escalator (e.g., refer to (a) of FIG. 12).

The user terminal 100 may move to the same floor to that of the destination and then the route guidance to the destination may be initiated.

Hereinafter, a route guidance method using guidance information based on real-time information on the periphery of the user terminal 100 acquired based on the video is described.

In operation 430, the user terminal 100 may acquire real-time information on the periphery of the user terminal 100 based on the video. The real-time information may be acquired by analyzing a live video captured by a camera. For example, the real-time information may include a congestion level around the user terminal 100. The user terminal 100 may count the number of persons included in the video or may calculate the congestion level around the user terminal 100 in consideration of the presence or absence of a feature or an obstacle. That is, the user terminal 100 may calculate the congestion level around the user terminal 100 based on the number of dynamic objects in the video.

In operation 440, the user terminal 100 may augment and display, in the video, additional guidance information on the route guidance to the destination based on the real-time information or may modify the content described in operation 410 to display different guidance information and may augment and display the modified content in the video. Through an example embodiment, since guidance information based on the real-time information on periphery of the user terminal 100 is augmented and displayed in the video, guidance information suitable for a situation at the route guidance time may be provided.

For example, if a congestion level around the user terminal 100 determined based on the real-time information (i.e., a congestion level of an area displayed in the video) is greater than or equal to a predetermined value, the user terminal 100 may augment and display additional guidance information in the video to provide a guidance on a detour route for at least a portion of the route around the user terminal 100, or may modify content (displayed in association with predetermined information registered to the node or the link) and may augment and display the modified content in the video. That is, when the congestion level around the user terminal 100 is determined to be high in providing the route guidance through the AR view, the user terminal 100 may guide the user to a detour route other than the original route. For example, when a ticket gate included in the route displayed through the video of the AR view is congested (i.e., when a congestion level around a node corresponding to the ticket gate is high), the user terminal 100 may guide the user to use another ticket gate by augmenting and displaying additional guidance information in the video or by modifying content to be displayed in association with the node corresponding to the congested ticket gate and displaying the modified content.

Also, when the congestion level around the user terminal 100 determined based on the real-time information is greater than or equal to the predetermined value, the user terminal 100 may augment and display, in the video, text information that includes a guidance on at least a portion of the route around the user terminal 100 and/or information requesting not to maintain or refer to the AR view as the additional guidance information. That is, in congested surroundings, the user terminal 100 may allow the user to be provided with the route guidance even without necessarily referring to the AR view. In congested surroundings, the user may verify the text information displayed on the user terminal 100 and may move to the destination. Also, the user may be guided by the user terminal 100 to not maintain the AR view when surroundings are congested. Alternatively, the route guidance in congested surroundings may be provided through audio instead of the text information (or in addition thereto).

Figure 19:
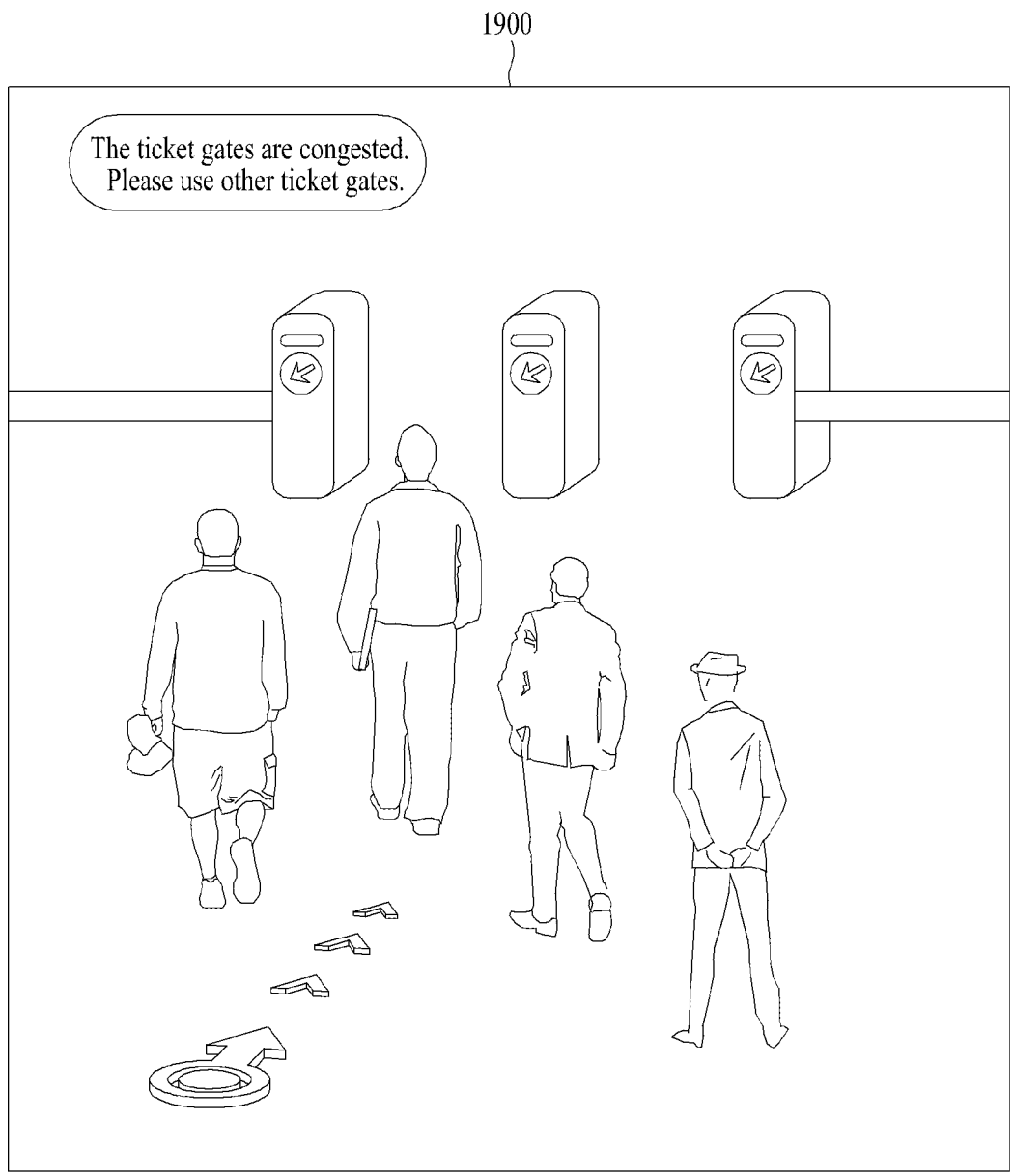
FIGS. 19 and 20 illustrate a method of augmenting and displaying, in a video of an AR view, guidance information based on real-time information on periphery of a user terminal according to an example.
Figure 20:
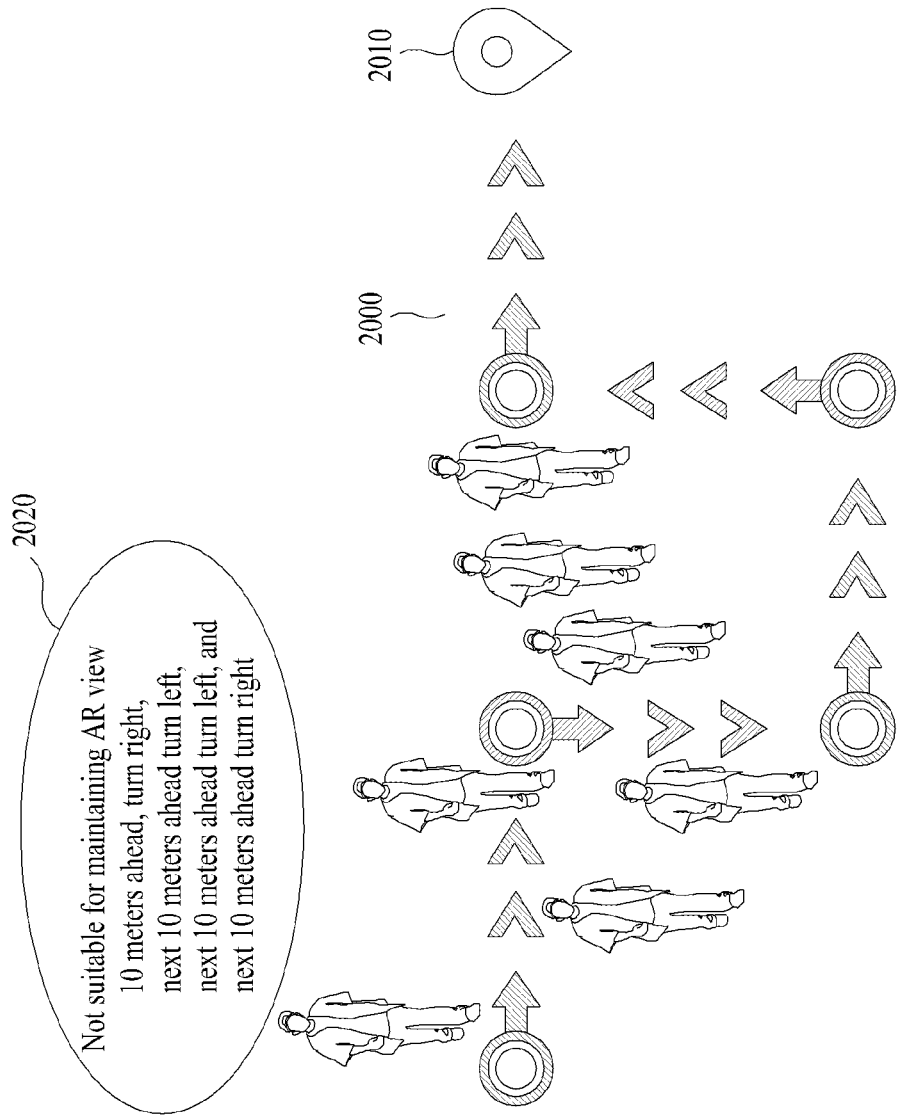

In this regard, FIGS. 19 and 20 illustrate an example of augmenting and displaying, in a video of an AR view, guidance information based on real-time information on periphery of the user terminal 100 according to an example.

FIG. 19 illustrates an AR view 1900 of a screen of the user terminal 100. As illustrated, when a congestion level around a ticket gate the user desires to pass through is determined to be high as a video analysis, the user terminal 100 may guide the user to use another ticket gate through additional guidance information (or content modified to display different guidance information). For example, the user terminal 100 may augment and display guidance information, such as "The ticket gates are congested. Please use other ticket gates," in the video. Alternatively, although not illustrated, the user terminal 100 may additionally augment and display, in the video, a direction indicator for guiding to a detour route (i.e., another ticket gate). The direction indicator for guiding to the detour route (i.e., the other ticket gate) may be visually distinguished from the direction indicator for guiding to the existing route (congested ticket gate).

Meanwhile, the user terminal 100 may compare a location of the ticket gate recognized from the AR view and a location of content to be augmented and may appropriately adjust a location at which the content is to be augmented in consideration of the location of the ticket gate.

Also, referring to FIG. 20, when a congestion level in a route 2000 to a destination 2010 is high according to a video analysis, the user terminal 100 may augment and display, in the video, text information including a guidance to a surrounding route and information requesting to not maintain the AR view as additional guidance information 2020. The information 2020 augmented and displayed in the video may include text information, for example, "Not suitable for maintaining the AR view" and "10 meters ahead turn right, next 10 meters ahead turn left, next 10 meters ahead turn left, and next 10 meters ahead turn right."

When the congestion level is high, the user terminal 100 may determine that it is difficult for the user to move while carrying a camera and may provide route guidance to a destination through text information (which summarizes the route guidance on the destination) and may induce the user to not maintain the AR view. The additional guidance information 2020 may be provided as audio instead of text information (or in addition thereto).

Description related to technical features made above with reference to FIGS. 1 to 3 and FIGS. 7, 10, and 18 may apply to FIGS. 4, 8, 9, 11, 12, FIGS. 14 to 17, and FIGS. 19 and 20 and thus, further description is omitted.

Figure 5:
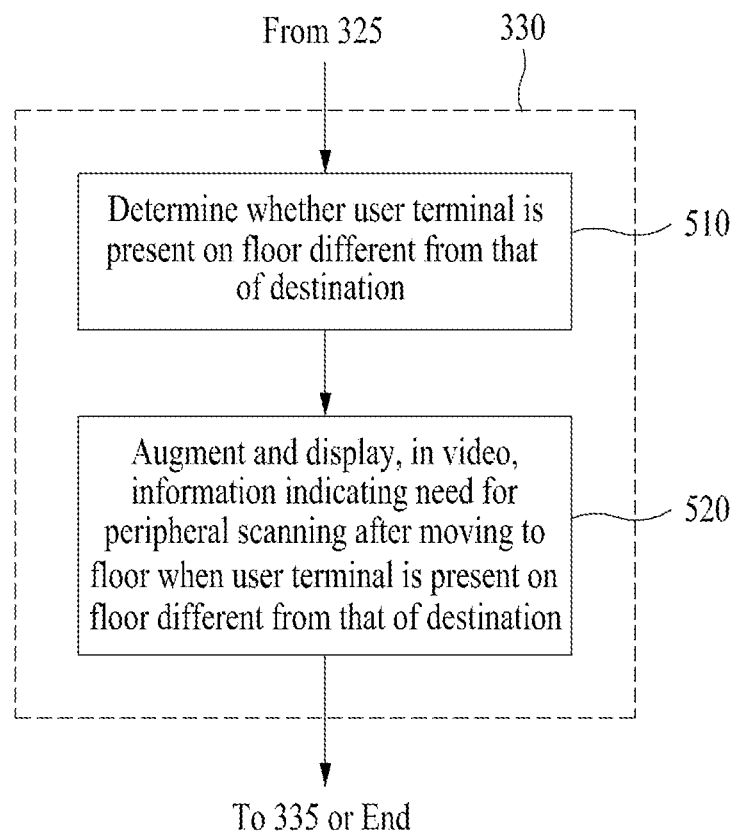

FIG. 5 is a flowchart illustrating a method of providing route guidance by augmenting and displaying guidance information in a video of an AR view according to an example.

The method of providing the route guidance from the starting point to the destination through the AR view in operation 330 is further described with reference to FIG. 5.

In operation 510, the user terminal 100 may determine whether the user terminal 100 is present on a floor different from that of the destination. The user terminal 100 may communicate with, e.g., APs (access points), a beacon, etc., in the specific floor to acquire the floor information, may use a sensor (e.g., altitude sensor) to acquire/calculate the floor information, or may determine the floor where the terminal is located based on the analysis of live video captured by the camera.

In operation 520, when the user terminal 100 is determined to be present on the floor different from that of the destination, the user terminal 100 may augment and display, in the video, information indicating a need for peripheral scanning after moving to a floor.

That is, when the user terminal 100 is determined to be present on the floor different from that of the destination, the user terminal 100 may guide the user to move to another floor (the floor on which the destination is present) (without displaying a direction indicator indicating a direction in which the user needs to move). A case in which the user terminal 100 is present on the floor different from that of the destination may represent a state in which peripheral scanning is required again and a state in which it is impossible to display the direction indicator indicating the direction in which the user needs to move.

In this regard, FIG. 13 illustrates a screen 1300 of the user terminal 100 for route guidance using an AR view according to an example. Referring to FIG. 13, when a route search is conducted on a subway platform, the destination may be on a floor different from a location of the user terminal 100. Here, the user terminal 100 may augment and display, in the video, information 1310 indicating that peripheral scanning is required after moving to the floor ("(please) Peripheral scanning after moving to the floor"). If peripheral scanning is required after moving to a floor, corresponding information may be displayed even in a map view area 1320. For example, as illustrated, not a map but an indicator indicating that an (indoor) location of the user terminal 100 is not properly identified may be displayed in the map view area 1320.

If the user moves around stairs for movement between floors (i.e., enters within the action range of a node corresponding to stairs), the user terminal 100 may display guidance information as described above in (a) and/or (b) of FIG. 12.

When the user terminal 100 is verified to have moved to the floor, the user terminal 100 may perform peripheral scanning (e.g., by sensing a change in altitude).

Once peripheral scanning is completed, the user terminal 100 may continue to guide the destination according to an example embodiment.

Description related to technical features made above with reference to FIGS. 1 to 4, FIGS. 7 to 12, and FIGS. 14 to 20 may apply to FIGS. 5 and 13 and thus, further description is omitted.

Figure 6:
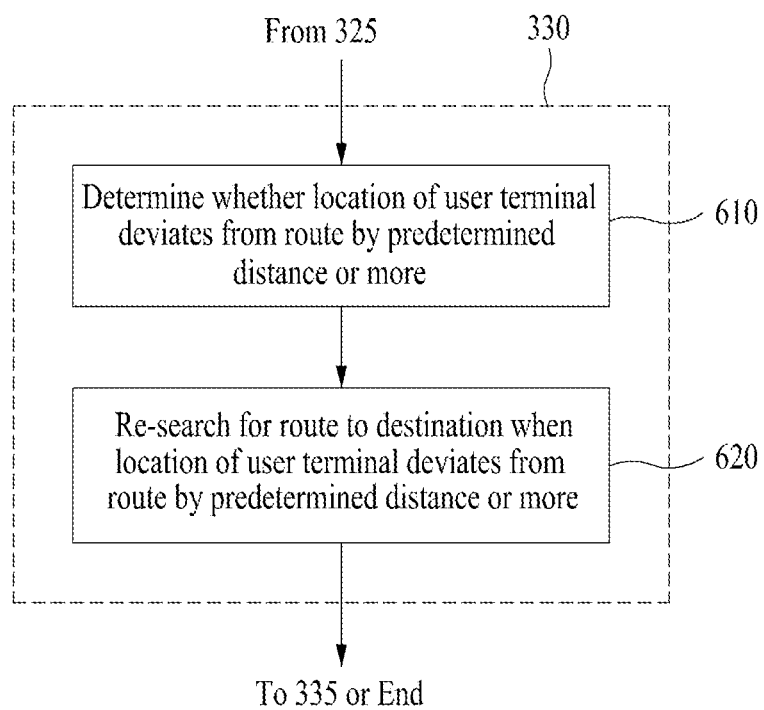
FIG. 6 is a flowchart illustrating a method of re-searching for a route in providing route guidance according to an example.

FIG. 6 is a flowchart illustrating a method of re-searching for a route in providing route guidance according to an example.

The method of providing the route guidance from the starting point to the destination through the AR view in operation 330 is further described with reference to FIG. 6.

In operation 610, the user terminal 100 may determine whether a location of the user terminal deviates from the route acquired in operation 320 by a predetermined distance or more.

In operation 620, when the location of the user terminal 100 deviates from the route by the predetermined distance or more, the user terminal 100 may re-search for the route to the destination. The predetermined distance may be set by the user of the user terminal 100 or the server 200. Therefore, when the user is determined to deviate from the route, the user terminal 100 may re-search for the route to the destination. Through the route re-research, the route may be re-generated. That is, the server 200 may re-generate the route and the user terminal 100 may re-acquire the route.

Meanwhile, when a congestion level around the user terminal 100 determined based on real-time information described above with reference to FIG. 4 is greater than or equal to a predetermined value, the predetermined distance may be set to further increase. That is, when the congestion level around the user terminal 100 is greater than or equal to the predetermined value, the user terminal 100 may determine that the user has not deviated from the route although the user has deviated from the route further than the existing set distance.

Therefore, when the user inevitably deviates from the route to avoid a congestion situation, the user may be regarded as having not deviated from the route and unnecessary re-search and re-generation (re-acquisition) of the route to the destination may be prevented.

Description related to technical features made above with reference to FIGS. 1 to 5 and FIGS. 7 to 20 may apply to FIG. 6 and thus, further description is omitted.

The apparatuses described herein may be implemented using hardware components, software components, and/or a combination thereof. For example, the apparatuses and the components described herein may be implemented using one or more computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may include, alone or in combination with program instructions, a data file, a data structure, and the like. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A route guidance method performed by a user terminal, comprising:

acquiring a route from a starting point to a destination set by a user of the user terminal, the route including a plurality of nodes, and the route being formed by links connecting pairs of nodes among the plurality of nodes; and providing route guidance from the starting point to the destination through an augmented reality (AR) view that includes a video captured by a camera of the user terminal based on the route, the providing of the route guidance includes augmenting and displaying content related to first information in the video as guidance information based on an interaction between the user terminal and one of a node to which the first information is registered among the plurality of nodes, or a link to which the first information is registered among the links
as the user terminal moves toward the destination based on the route,
wherein
the providing of the route guidance includes,
acquiring real-time information on a periphery of the user terminal based on the video, and
performing one of,
augmenting and displaying additional guidance information on the route guidance to the destination in the video based on the real-time information, or
modifying the content to display different guidance information based on the real-time information, and augmenting and displaying the modified content in the video, and
the additional guidance information or the modified content includes text information based on a congestion level around the user terminal being greater than or equal to a first value, the congestion level being determined based on the real-time information, and the text information including,
guidance on at least a portion of the route around the user terminal, and
information that requests to not maintain the AR view.

2. The route guidance method of claim 1, wherein the providing of the route guidance comprises augmenting and displaying the content in response to determining the user terminal has approached within a first distance from a location corresponding to
the node to which the first information is registered, or
the link to which the first information is registered or arrives at the corresponding location.

3. The route guidance method of claim 2, wherein the augmenting and displaying comprises:
modifying the content; and
augmenting and displaying the modified content in the video to display different guidance information according to a direction in which the user terminal approaches the node to which the first information is registered, or the link to which the first information is registered.

4. The route guidance method of claim 1, wherein the content is displayed at a location in the video related to
the node to which the first information is registered, or
the link to which the first information is registered; and
the content includes at least one of information on
a direction in which the user is to move, or
an action to be taken by the user.

5. The route guidance method of claim 4, wherein the content includes the information on the action; and the information on the action includes at least one of
passing through a ticket gate,
passing through an entry gate,
passing through an exit gate,
moving to stairs,
avoiding an obstacles,
using an elevator, or
preparing a ticket or fare.

6. The route guidance method of claim 1, further comprising:
displaying a map view that includes a map matched to the video with the AR view, the map view including the route and a current location of the user terminal.

7. The route guidance method of claim 1, wherein the providing of the route guidance comprises:

augmenting and displaying a direction indicator in the video, the direction indicator indicating a direction in which the user is to move to reach the destination.

8. The route guidance method of claim 7, wherein the augmenting and displaying of the direction indicator comprises:
displaying the direction indicator in an area corresponding to a surface of the route; and
displaying an additional direction indicator indicating a turn above the surface in response to determining the user is to make a turn.

9. The route guidance method of claim 1, wherein the providing of the route guidance comprises:
augmenting and displaying peripheral scanning information in the video, the peripheral scanning information indicating that peripheral scanning is to be performed after moving to a floor in response to determining the user terminal is present on a floor different from that of the destination.

10. The route guidance method of claim 1, wherein the providing of the route guidance comprises:
augmenting and displaying additional guidance information in the video based on a route attribute of the route as the user terminal moves toward the destination based on the route.

11. The route guidance method of claim 10, wherein the augmenting and displaying of the additional guidance information comprises augmenting and displaying in the video at least one of:
first additional guidance information for guiding the user to continue going straight in response to determining the user is to go straight for a first distance or more from a current location;
second additional guidance information for requesting to maintain the AR view in response to determining the user is to make a turn a first number of times or more within a second distance from the current location; or
third additional guidance information including text information for guiding turns of a second number of times or more in response to determining the user is to make a turn the second number of times or more within a third distance from the current location.

12. The route guidance method of claim 10, wherein
the route includes a movement between floors;
the additional guidance information comprises information indicating the movement between floors; and
the augmenting and displaying includes augmenting and displaying the additional guidance information without displaying a direction indicator indicating a direction in which the user is to move to reach the destination in response to determining the user terminal is present on a floor different from that of the destination.

13. The route guidance method of claim 10, wherein
the additional guidance information comprises a point of interest (POI) present around the route; and
the POI is a POI previously visited by the user or a POI registered by the user.

14. The route guidance method of claim 1, further comprising:
augmenting and displaying information on a POI present around a current location of the user in the video as the user terminal moves towards the destination based on the route, the information on the POI is tagged information by including z-axis location information for an object corresponding to the POI included in a map that represents a three-dimensional (3D) space corresponding to periphery of the current location, and a location for displaying the information on the POI in the video being determined based on the z-axis location information.

15. The route guidance method of claim 1, wherein the additional guidance information or the modified content includes a detour route for at least a portion of the route around the user terminal based on a congestion level around the user terminal being greater than or equal to a first value, the congestion level being determined based on the real-time information.

16. The route guidance method of claim 1, wherein the providing of the route guidance comprises re-searching for the route to the destination based on a location of the user terminal deviates from the route by a first distance or more, the first distance increasing in response to determining a congestion level around the user terminal is greater than or equal to a first value, and the congestion level being determined based on the real-time information.

17. A computer system for implementing a user terminal, comprising:
at least one processor configured to execute computer-readable instructions included in a memory to cause the computer system to
acquire a route from a starting point to a destination set by a user, the route including a plurality of nodes, and the route being formed by links connecting pairs of nodes among the plurality of nodes,
provide route guidance from the starting point to the destination through an augmented reality (AR) view that includes a video captured by a camera of the user terminal based on the route, and
augment and display content related to first information in the video as guidance information based on an interaction between the user terminal and one of
a node to which the first information is registered among the plurality of nodes, or
a link to which the first information is registered among the links, as the user terminal moves toward the destination based on the route,
wherein
the at least one processor is configured to cause the computer system to provide the route guidance including,
acquiring real-time information on a periphery of the user terminal based on the video, and
performing one of,
augmenting and displaying additional guidance information on the route guidance to the destination in the video based on the real-time information, or
modifying the content to display different guidance information based on the real-time information, and augmenting and displaying the modified content in the video, and
the additional guidance information or the modified content includes text information based on a congestion level around the user terminal being greater than or equal to a first value, the congestion level being determined based on the real-time information, and the text information including,
guidance on at least a portion of the route around the user terminal, and
information that requests to not maintain the AR view.

18. A route guidance method performed by a user terminal, comprising:
acquiring a route from a starting point to a destination set by a user of the user terminal, the route including a plurality of nodes, and the route being formed by links connecting pairs of nodes among the plurality of nodes; and
providing route guidance from the starting point to the destination through an augmented reality (AR) view that includes a video captured by a camera of the user terminal based on the route, the providing of the route guidance includes augmenting and displaying content related to first information in the video as guidance information based on an interaction between the user terminal and one of
a node to which the first information is registered among the plurality of nodes, or
a link to which the first information is registered among the links as the user terminal moves toward the destination based on the route,
wherein
the providing of the route guidance includes,
acquiring real-time information on a periphery of the user terminal based on the video, and
performing one of,
augmenting and displaying additional guidance information on the route guidance to the destination in the video based on the real-time information, or
modifying the content to display different guidance information based on the real-time information, and augmenting and displaying the modified content in the video, and
the providing of the route guidance comprises re-searching for the route to the destination based on a location of the user terminal deviates from the route by a first distance or more, the first distance increasing in response to determining a congestion level around the user terminal is greater than or equal to a first value, and the congestion level being determined based on the real-time information.

* * * * *